(12) United States Patent
Honermann et al.

(10) Patent No.: US 12,453,415 B2
(45) Date of Patent: Oct. 28, 2025

(54) FIREARM HOLDER INCLUDING A STOCK LOCK AND MUZZLE HOLDER

(71) Applicant: Quality Wood Designs Inc., Mitchell, SD (US)

(72) Inventors: Michael Honermann, Mitchell, SD (US); Victor Honermann, Mitchell, SD (US)

(73) Assignee: Quality Wood Designs Inc., Mitchell, SD (US)

( * ) Notice: Subject to any disclaimer, the term of this patent is extended or adjusted under 35 U.S.C. 154(b) by 0 days.

(21) Appl. No.: 18/762,803

(22) Filed: Jul. 3, 2024

(65) Prior Publication Data

US 2024/0349889 A1 Oct. 24, 2024

Related U.S. Application Data

(63) Continuation of application No. 17/311,658, filed as application No. PCT/US2019/064049 on Dec. 2, 2019, now Pat. No. 12,064,032.

(60) Provisional application No. 62/776,675, filed on Dec. 7, 2018.

(51) Int. Cl.
*A47B 81/00* (2006.01)
*A47F 5/08* (2006.01)
*A47F 7/00* (2006.01)

(52) U.S. Cl.
CPC ............ *A47B 81/005* (2013.01); *A47B 81/00* (2013.01); *A47F 5/0861* (2013.01); *A47F 7/0021* (2013.01); *A47F 7/0028* (2013.01); *A47F 7/0035* (2013.01)

(58) Field of Classification Search
CPC ..... A47B 81/005; A47B 81/00; A47F 5/0861; A47F 7/0021; A47F 7/0028; A47F 7/0035
See application file for complete search history.

(56) References Cited

U.S. PATENT DOCUMENTS

| | | | | |
|---|---|---|---|---|
| 2,097,939 A | * | 11/1937 | Timm | A47B 81/005 211/8 |
| 2,552,293 A | * | 5/1951 | Page | B60R 7/14 224/311 |
| 2,581,246 A | * | 1/1952 | Fenton | B29C 33/76 211/60.1 |
| 2,710,732 A | * | 6/1955 | Peters | E06B 7/28 248/101 |
| 2,855,108 A | * | 10/1958 | Haapala | A47B 81/005 211/64 |

(Continued)

*Primary Examiner* — Stanton L Krycinski
(74) *Attorney, Agent, or Firm* — Westman, Champlin & Koehler, P.A.

(57) ABSTRACT

In some embodiments, a device includes a firearm holder including a stock lock. The stock lock may include a first jaw, a second jaw, a pivot pin to couple the first jaw to the second jaw. The first jaw may pivot about the pivot pin relative to the second jaw and may open and close about a neck of a stock of a firearm. The stock lock may further include a rotatable element coupled to the first jaw to allow at least a portion of the first jaw to rotate about the rotatable element to move into and out of alignment with the first jaw. In some implementations, the stock lock may include a locking mechanism. In some aspects, the stock lock may include a cowl extending about at least a portion of the locking mechanism.

14 Claims, 24 Drawing Sheets

(56) References Cited

U.S. PATENT DOCUMENTS

| | | | | |
|---|---|---|---|---|
| 2,946,452 A * | 7/1960 | Caloiero | A47B 81/005 | 211/64 |
| 2,953,251 A * | 9/1960 | Stone | A47J 47/16 | 211/4 |
| 2,999,378 A * | 9/1961 | Blair | A63C 11/006 | 280/814 |
| 3,223,302 A * | 12/1965 | Helm | B60R 9/12 | 224/325 |
| 3,242,704 A * | 3/1966 | Barreca | A63C 11/007 | 211/70.5 |
| 3,275,160 A * | 9/1966 | Zurker | B60R 9/12 | 248/214 |
| 3,291,317 A * | 12/1966 | Bowen | F41A 23/18 | 248/220.21 |
| 3,291,427 A * | 12/1966 | Hutchings | A47B 81/005 | 224/406 |
| 3,326,385 A * | 6/1967 | Pinkerton | E05B 73/00 | 211/64 |
| 3,419,154 A * | 12/1968 | Shapiro | A47F 7/24 | 211/124 |
| 3,472,385 A * | 10/1969 | Parillo | A47F 7/24 | 211/124 |
| 3,507,398 A * | 4/1970 | Schaefer | A47B 81/005 | 211/64 |
| 3,558,090 A * | 1/1971 | Bird | A47B 81/005 | 292/216 |
| 3,643,811 A * | 2/1972 | Howerton | A47B 81/005 | 211/64 |
| D226,051 S * | 1/1973 | Fujinami | D6/552 | |
| 3,848,785 A * | 11/1974 | Bott | B60R 9/12 | 224/323 |
| 3,857,491 A * | 12/1974 | Townsend | A47B 81/005 | 211/8 |
| 4,063,646 A * | 12/1977 | Stahl, Jr. | A01K 97/08 | 211/4 |
| 4,139,100 A * | 2/1979 | Reed | A47B 81/005 | 211/64 |
| 4,204,601 A * | 5/1980 | Thomas | E05B 69/006 | 211/124 |
| 4,216,665 A * | 8/1980 | McKelvey | A63C 11/006 | 70/58 |
| 4,226,399 A * | 10/1980 | Henderson | E05B 73/00 | 42/70.11 |
| 4,245,745 A * | 1/1981 | Verelle | A63C 11/007 | 211/8 |
| 4,300,690 A * | 11/1981 | Thomas | A47F 7/024 | 211/124 |
| 4,450,989 A * | 5/1984 | Bogar, Jr. | A47B 81/005 | 224/571 |
| 4,596,334 A * | 6/1986 | Daulton | B60R 7/14 | 211/8 |
| 4,720,031 A * | 1/1988 | Zimmerman | B60R 9/12 | 224/323 |
| 4,735,350 A * | 4/1988 | Kamaya | B60R 9/048 | 224/323 |
| 4,747,280 A * | 5/1988 | Shaw | E05B 47/0603 | 70/279.1 |
| 4,776,471 A * | 10/1988 | Elkins | A47B 57/52 | 224/482 |
| 4,811,853 A * | 3/1989 | Mead | B65D 85/185 | 211/124 |
| 4,867,362 A * | 9/1989 | Finnegan | B60R 9/12 | 280/727 |
| 4,881,386 A * | 11/1989 | Glines | B60R 7/14 | 42/70.11 |
| 4,930,671 A * | 6/1990 | Tittel | B60R 9/12 | 224/329 |
| 4,949,559 A * | 8/1990 | Glines | E05B 47/0603 | 70/279.1 |
| 5,054,673 A * | 10/1991 | Dixon | B60R 9/12 | 224/325 |
| 5,085,326 A * | 2/1992 | Russell | B60P 7/12 | 211/60.1 |
| 5,115,955 A * | 5/1992 | Dallaire | B60R 9/12 | 224/322 |
| 5,138,786 A * | 8/1992 | Fischer | E05B 73/00 | 42/70.11 |
| 5,154,072 A * | 10/1992 | Leyden | E05B 69/006 | 70/59 |
| 5,160,048 A * | 11/1992 | Leyden | E05B 69/006 | 70/59 |
| 5,282,539 A * | 2/1994 | Saathoff | A47B 81/005 | 42/70.11 |
| 5,287,972 A * | 2/1994 | Saathoff | A47B 81/005 | 42/70.11 |
| 5,339,966 A * | 8/1994 | Bastiaans | E05B 73/00 | 211/64 |
| 5,344,032 A * | 9/1994 | Ramsdell | A47B 81/005 | 211/64 |
| 5,490,621 A * | 2/1996 | Dixon | B60R 9/12 | 248/316.1 |
| 5,520,291 A * | 5/1996 | Graham | A47B 81/005 | 211/70.5 |
| 5,524,772 A * | 6/1996 | Simmons | A47B 81/005 | 211/4 |
| 5,588,542 A * | 12/1996 | Winkler, Jr. | A47B 81/005 | 211/89.01 |
| 5,657,913 A * | 8/1997 | Cucheran | B60R 9/12 | 224/558 |
| 5,675,999 A * | 10/1997 | Carlstrom | A63C 11/006 | 70/58 |
| 5,676,257 A * | 10/1997 | Adkins | A47B 81/005 | 211/64 |
| D394,240 S * | 5/1998 | Cucheran | D12/412 | |
| 5,779,120 A * | 7/1998 | Morford | B60R 7/14 | 224/570 |
| 5,823,358 A * | 10/1998 | Leyden | A47F 5/0861 | 211/124 |
| 5,887,730 A * | 3/1999 | St. George | A47B 81/005 | 211/64 |
| 5,934,112 A * | 8/1999 | Rice | F41A 23/18 | 211/8 |
| 5,979,846 A * | 11/1999 | Fluhr | B60R 7/14 | 248/552 |
| 6,018,968 A * | 2/2000 | Sides | E05C 19/18 | 292/288 |
| 6,142,313 A * | 11/2000 | Young | F41A 23/18 | 42/70.11 |
| 6,863,185 B2 * | 3/2005 | Mele | A47F 7/024 | 211/60.1 |
| 7,047,771 B2 * | 5/2006 | Tanos | B60R 7/14 | 70/279.1 |
| 8,596,590 B2 * | 12/2013 | McCoy | F16M 13/02 | 248/68.1 |
| 8,875,963 B2 * | 11/2014 | Knutson | A01K 97/08 | 224/922 |
| 9,151,082 B2 * | 10/2015 | Zalavari | F41A 23/18 | |
| 9,763,515 B2 * | 9/2017 | Fratilla | A47B 73/00 | |
| 9,987,997 B2 * | 6/2018 | Rarey | B60R 9/048 | |
| 11,076,692 B2 * | 8/2021 | Canova | F16L 3/1075 | |
| 11,091,103 B2 * | 8/2021 | Winkler | B60R 11/06 | |
| 2007/0024165 A1 * | 2/2007 | Moulton | A47B 81/005 | 312/291 |
| 2013/0320180 A1 * | 12/2013 | Castellanos | A47B 96/06 | 248/223.41 |
| 2015/0272324 A1 * | 10/2015 | Self | F41A 23/18 | 211/64 |
| 2016/0007743 A1 * | 1/2016 | Koder | A47B 73/002 | 211/74 |
| 2019/0365095 A1 * | 12/2019 | Di Prima | A47B 73/00 | |

* cited by examiner

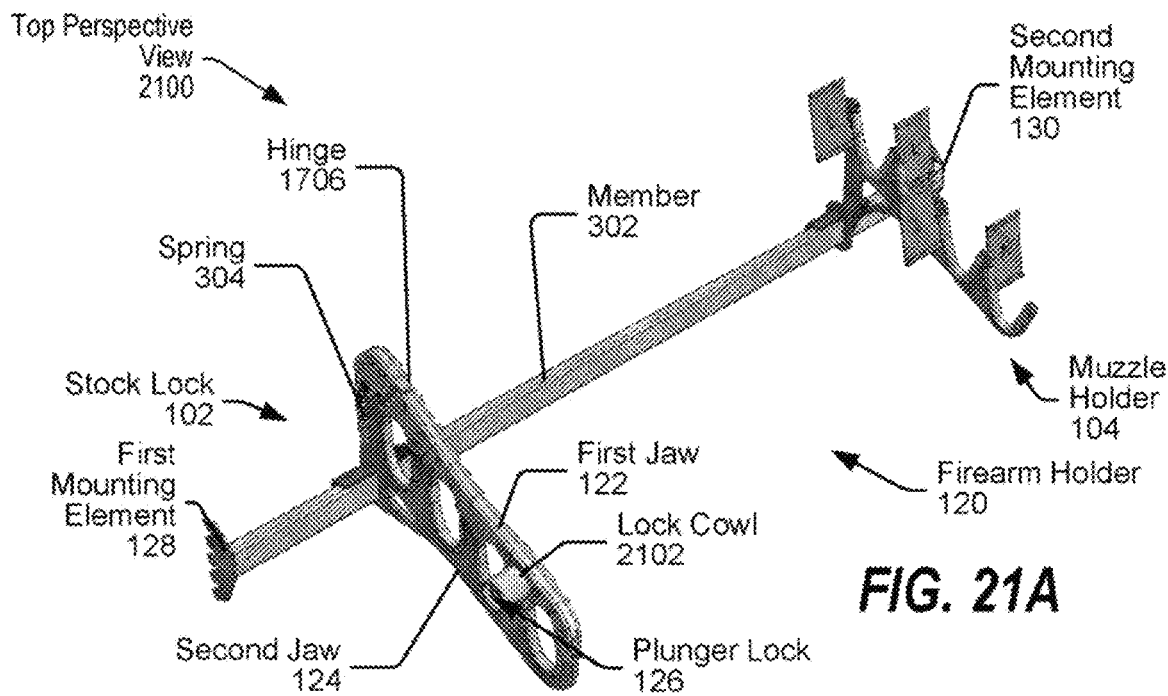
FIG. 21A
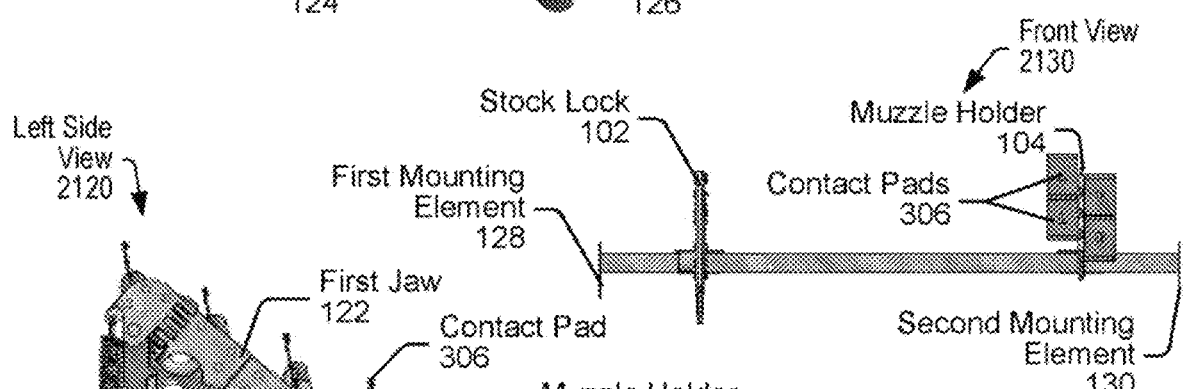
FIG. 21C
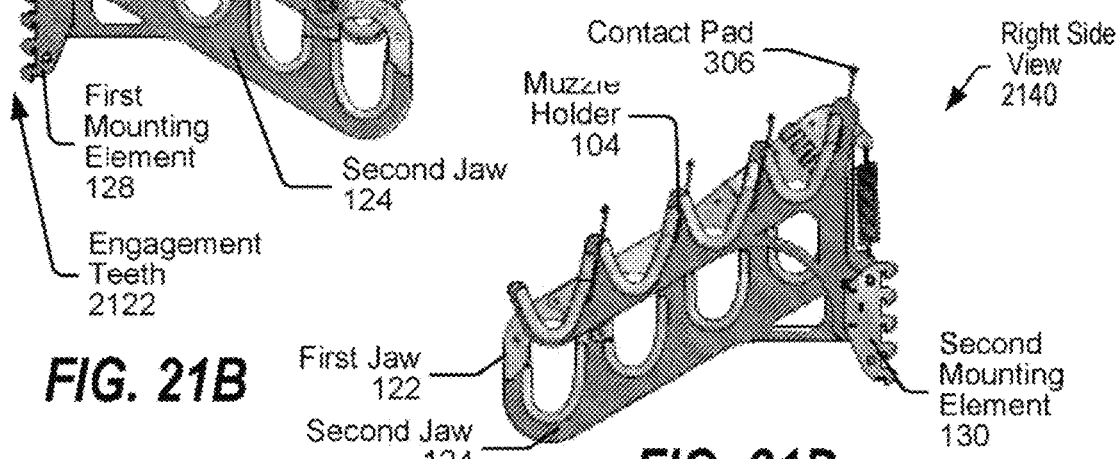
FIG. 21B
FIG. 21D

FIREARM HOLDER INCLUDING A STOCK LOCK AND MUZZLE HOLDER

CROSS-REFERENCE TO RELATED APPLICATION(S)

This application is a continuation of U.S. Patent Application Ser. No. 17/311,658, filed Mar. 3, 2022, which is a national stage application of and claims priority to PCT Application No. PCT/US19/64049 filed on Dec. 2, 2019 and entitled "Firearm Holder Including a Stock Lock and Muzzle Holder," which is a non-provisional, international application claiming priority to U.S. Provisional Patent Application No. 62/776,675 filed on Dec. 7, 2018 and entitled "Firearm Display Device Including a Stock Lock and Muzzle Holder"; which are incorporated herein by reference in their entireties.

FIELD

The present disclosure is generally related to firearm holder devices, and more particularly to firearm holders including a locking mechanism or stock lock that may be configured to support and releasably lock each firearm into the firearm holder via its stock and including a muzzle holder that may support a barrel or muzzle of each firearm.

BACKGROUND

Gun racks or display devices may be adapted to support firearms for commercial display for use, for example, in a retail store. Cable locks threaded through the trigger guards can restrict access and reduce the threat of shoplifting-type thefts; however, such locks may restrict access to the firearms and make selling such items more difficult for sales personnel. Such locks may hinder handling and showing of the firearm to potential purchasers.

Locks may be used to secure cabinet doors. However, locks on the display cabinets can be readily broken by a thief to access the displayed firearms.

SUMMARY

Embodiments of firearm holders are described below that can support a firearm for display while locking the firearm to the firearm holder to prevent theft. In some implementations, the firearm holder may include a stock lock portion and a muzzle holder portion. The muzzle holder portion may support a barrel or muzzle of a firearm. The stock lock portion may include a first jaw and a second jaw that may be coupled at a proximal end by a pin defining a pivot axis and that may be releasable coupled at a distal end by a push lock or other locking mechanism. The first jaw may be configured to pivot relative to the second jaw to clamp together around a narrow portion of a stock of a firearm, securing the firearm to the firearm holder. In some implementations, in addition to or in lieu of the pin, a swivel assembly or hinge may be provided to enable a secondary rotation of the first jaw relative to the second jaw to provide greater access to the firearm. Other implementations are also possible.

In other embodiments, a device includes a firearm holder. The firearm holder includes a muzzle holder and a stock lock. The stock lock may include a second jaw and a first jaw. The first jaw may be configured to pivot relative to the second jaw to releasably secure a stock of a firearm. In some implementations, the stock lock may include a locking mechanism, such as a plunger lock, to secure the first jaw to the second jaw. In some implementations, the firearm holder may include a swivel assembly or hinge to enable rotation of the first jaw relative to the second jaw to provide greater access to the firearm.

In some embodiments, a device includes a firearm holder including a stock lock. The stock lock may include a first jaw, a second jaw, a pivot pin to couple the first jaw to the second jaw. The first jaw may pivot about the pivot pin relative to the second jaw and may open and close about a neck of a stock of a firearm. The stock lock may further include a second element coupled to the first jaw. At least a portion of the first jaw may rotate about the second element such that the portion moves into and out of alignment with the first jaw. In some aspects, the firearm holder may include a locking mechanism coupled to the first jaw. In some aspects, the firearm holder may include a cowl extending around at least a portion of the locking mechanism.

In other embodiments, a device may include a firearm holder comprising a stock lock to support one or more firearms. The stock lock may include a first jaw, a second jaw, a pivot pin, and a lock mechanism. The first jaw may include an opening at a distal end and a locking mechanism at a proximal end. The second jaw may include a first opening at a distal end and a second opening at a proximal end. The pivot pin may extend through the opening of the first jaw and the first opening of the second jaw to couple proximal ends of the first jaw and the second jaw. The first jaw may rotate about the pivot pin to open and close relative to the second jaw over a neck portion of a stock of a firearm. The lock mechanism may be coupled to a distal end of the first jaw and configured to selectively engage the second opening at the proximal end of the second jaw to secure the first jaw and the second jaw in a closed state.

BRIEF DESCRIPTION OF THE DRAWINGS

The detailed description is set forth with reference to the accompanying figures. In the figures, the left most digit(s) of a reference number identifies the figure in which the reference number first appears. The use of the same reference numbers in different figures indicates similar or identical items or features.

FIGS. 21A-21D depict views of a firearm holder including a reinforced lock, in accordance with certain embodiments of the present disclosure.

Figure 1A:
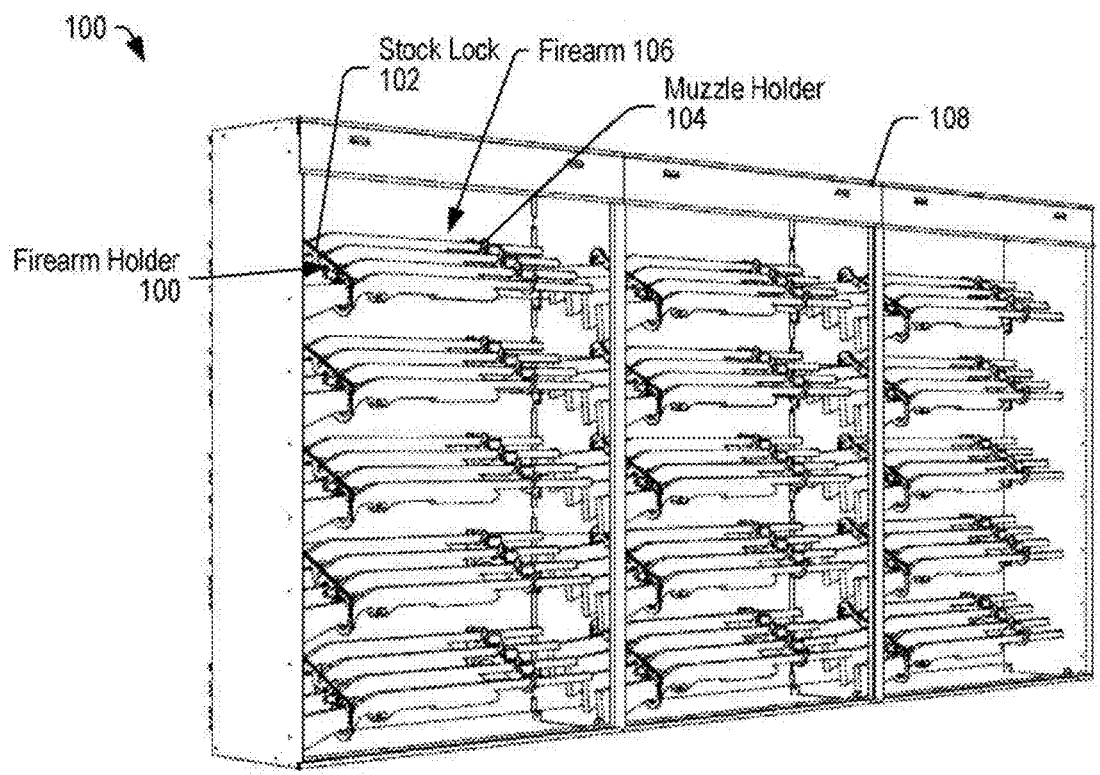
FIG. 1A depicts a firearm display device including a plurality of firearm holders with a locking mechanism in a closed state, in accordance with certain embodiments of the present disclosure.

While implementations are described in this disclosure by way of example, those skilled in the art will recognize that the implementations are not limited to the examples or figures described. The figures and detailed description thereto are not intended to limit implementations to the form disclosed, but on the contrary, the intention is to cover all modifications, equivalents, and alternatives falling within the spirit and scope as defined by the appended claims. The headings used in this disclosure are for organizational purposes only and are not meant to limit the scope of the description or the claims. As used throughout this application, the work "may" is used in a permissive sense (in other words, the term "may" is intended to mean "having the potential to") instead of in a mandatory sense (as in "must"). Similarly, the terms "include", "including", and "includes" mean "including, but not limited to".

DETAILED DESCRIPTION OF ILLUSTRATIVE EMBODIMENTS

Embodiments of firearm display devices are described below that may include a firearm holder, which may be configured to secure and support one or more firearms. Each firearm holder may be configured to support and secure one or more firearms, such as rifles, airsoft guns, pistols, other types of firearms, or any combination thereof. In some implementations, the firearm holder may include a first jaw and a second jaw. As used herein, the terms "first" and "second" are used to differentiate between two elements and are not intended to imply any particular order. The first jaw may be configured to move about a pivot axis to open and close relative to the second jaw. In some implementations, the firearm holder may be mounted within a cabinet or coupled to a supporting structure. Other implementations are also possible.

In some implementations, each firearm holder may include a firearm holder to support one or more firearms. The firearm holder may include a stock lock to support and secure a stock of a firearm, a muzzle holder to support a barrel or muzzle of the firearm, and a member configured to couple the stock lock to the muzzle holder and to a support structure. The muzzle holder may include a plurality of contact pads, each of which may be configured to support a muzzle of a firearm. The contact pads may include a cover or coating to prevent scratching of the firearm barrel or muzzle. The stock lock may include a second jaw including a plurality of recesses, each of which may be configured to receive a stock of a firearm. The stock lock may further include a first jaw coupled to the second jaw by a pivot pin and configured to open and close relative to the second jaw.

In some implementations the stock lock may also include a swivel assembly or a hinge configured to allow the first jaw (or a portion thereof) to turn or swing relative to the second jaw. The stock lock may include a plunger lock coupled to the first jaw and configured to engage an opening in the second jaw to secure the first jaw and the second jaw in a closed (locked) state. Embodiments of firearm holders are described below with respect to FIGS. 1A-9.

FIG. 1A depicts a firearm display device 100 including a plurality of firearm holders in a closed state, in accordance with certain embodiments of the present disclosure. The firearm display device 100 may include one or more firearms 106, each of which may be supported by a firearm holder 120 including a stock lock component 102 and by a muzzle holder 104. The firearm display device 100 may further include a cabinet 108 or another structure configured to support one or more firearm holders 120 (i.e., the stock lock components 102 and the muzzle holders 104).

Figure 1B:
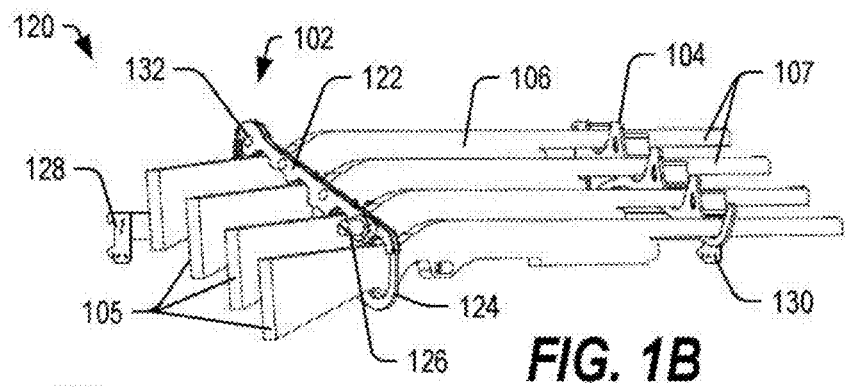
FIGS. 1B and 1C depict one of the firearm holders of FIG. 1A from two different perspective views of a firearm holder, showing the firearms locked in place by a closed and locked locking mechanism.
Figure 1C:
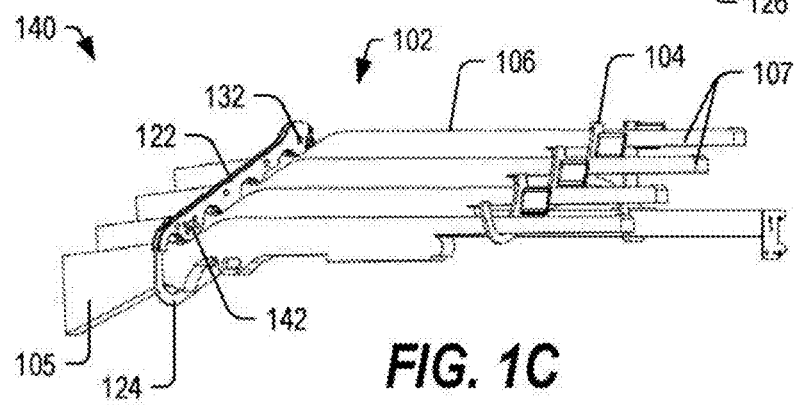

FIGS. 1B and 1C depict one of the firearm holders 120 of FIG. 1A from two different perspective views, showing the firearms 106 locked in place by a closed and locked stock lock component 102. In the illustrated example, each firearm 106 may include a stock 105 and a muzzle 107.

The firearm holder 120 may include a stock lock 102 including a first jaw 122 and a second jaw 124 coupled at or near their proximate ends via a pivot pin 132. The first jaw 122 may pivot about the pivot pin 132 relative to the second jaw 124. Further, the stock lock 102 may include a plunger lock 126 including a plunger pin 142 configured to releasably secure distal portions of the first jaw 122 to the second jaw 124 in a closed state to secure the firearms 106 by their stocks 105. In some implementations, the first jaw 122 and the second jaw 124 may define an enclosure sized to receive a narrow portion of the stock of the firearm 105. The enclosure may be too narrow to allow the stock of the firearm 105 to slide out of the firearm holder 120.

The firearm holder 120 may further include the muzzle holder 104 configured to support each of the muzzles 107. The muzzle holder 104 may include a cover or pad to prevent scratching of the muzzles 107 (or barrels) of the firearms 105. Additionally, the firearm holder 120 may include a structural member (such as a steel bar, rod, or other rigid element, such as member 302 in FIG. 3A), which may extend through the stock lock 102 and the muzzle holder and which may include a first mounting element 128 and a second mounting element 130 configured to secure the firearm holder 120 to the cabinet 108 or to another structure.

The plunger pin 142 may retract and extend to releasable secure the first jaw 122 to the second jaw 124. In FIG. 1C, the view 140 depicts a rear view of the plunger pin 142 of the plunger lock 126. The plunger pin 142 of the locking mechanism may be riveted or otherwise fixed to one of the first jaw 122 or the second jaw 124. The plunger pin 142 of the lock may be retracted or may extend through a corresponding opening in the second jaw 124 or the first jaw 122 to secure the first jaw 122 to the second jaw 124 in a closed and locked state.

In the illustrated example of FIGS. 1A-1C, the firearm holders are shown as securing a plurality of firearms horizontally. However, in other embodiments, the firearm holders may be configured to secure the plurality of firearms vertically or at another orientation. Additionally, while the illustrated examples depict four firearms 106 being held by each firearm holder 120, it should be appreciated that the firearm holder 120 is not limited. In some implementations, the firearm holder 120 may be implemented to hold one or more firearms 106. Other embodiments are also possible.

Figure 2A:
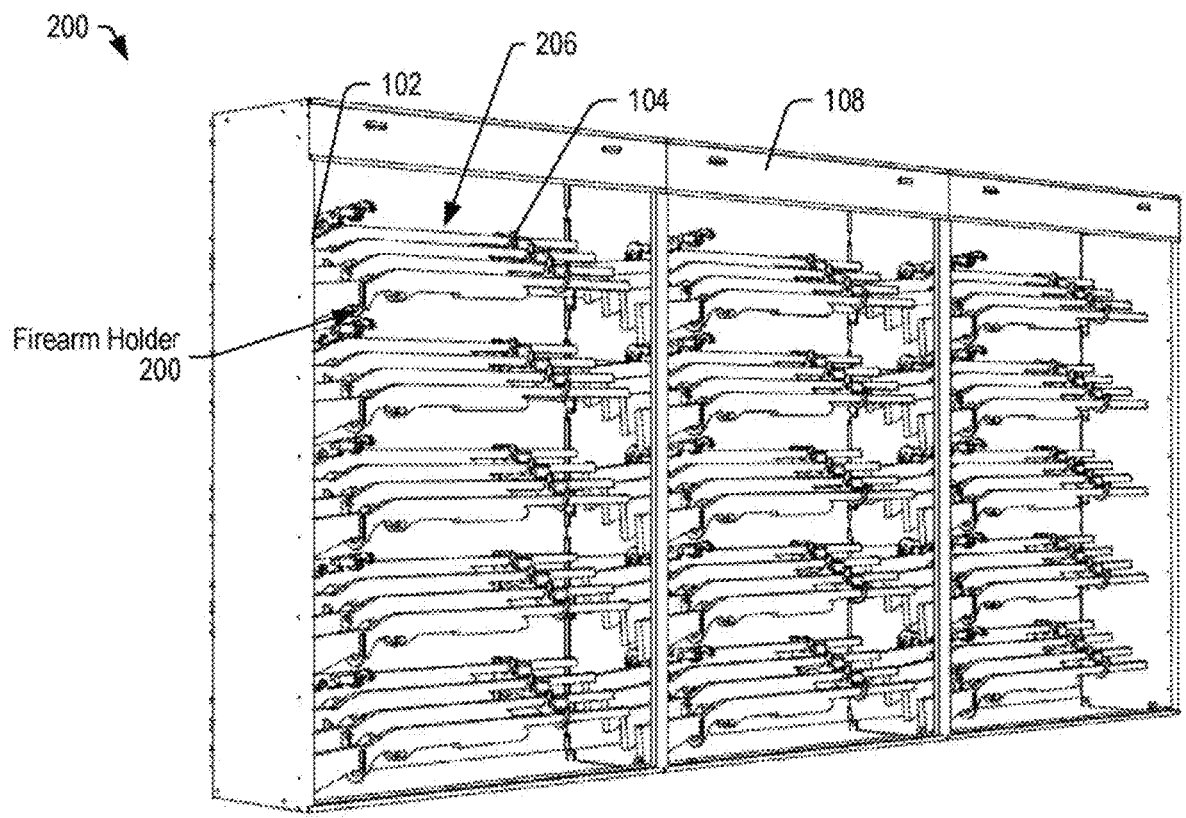
FIG. 2A depicts the firearm display device of FIG. 1A including a plurality of firearm holders including locking mechanisms in an unlocked and open state, in accordance with certain embodiments of the present disclosure.

FIG. 2A depicts a view 200 of the firearm display device 100 of FIG. 1A including a plurality of firearm holders 120 in an open state, in accordance with certain embodiments of the present disclosure. In the illustrated example, all the elements of the firearm display device 100 of FIG. 1 are shown, but the stock locks 102 are unlocked and open, allowing access to each of the firearms 106.

It should be appreciated that, while each of the firearm holders 120 are shown in an unlocked and open state, the firearm holders 120 may be unlocked and opened or closed and locked independently from one another. Additionally, the firearm holders 120 are depicted as holding the same types of firearms 106; however, the firearm holders 120 may differ from one another and may be sized to hold different types and sizes of firearms 106, depending on the implementation.

Figure 2B:
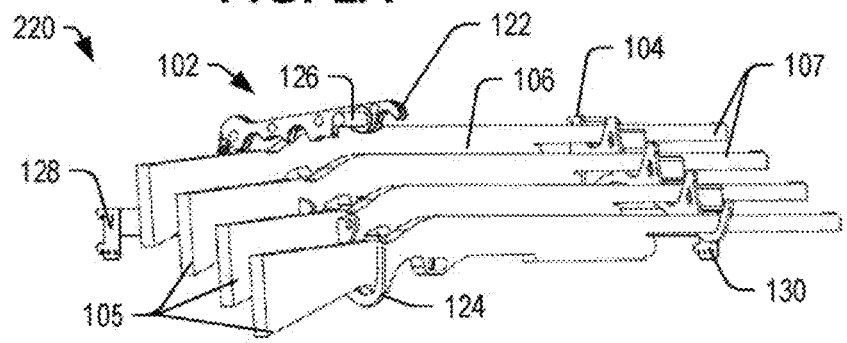
FIGS. 2B and 2C depict one of the firearm holders of FIG. 2A from two different perspective views, showing the firearms supported by a firearm holder with the locking mechanism in an unlocked and open state.
Figure 2C:
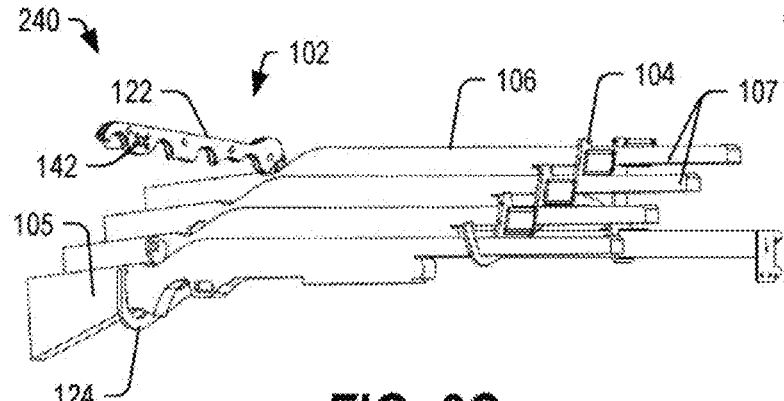

FIGS. 2B and 2C depict one of the firearm holders 220 of FIG. 2A from two different perspective views, showing the firearms 106 supported by an unlocked and open stock lock 102. In FIG. 2B, the view 220 depicts the firearm holder 120 including the stock lock 102 and the muzzle holder 104 from a left side perspective view. The stock lock 102 is depicted in an open and unlocked state. In FIG. 2C, the view 240 depicts a right-side perspective view of the firearm holder 120 include the stock lock 102 and the muzzle holder 104. The stock lock 102 is depicted in an open and unlocked state.

In the illustrated example of FIGS. 2A-2C, the firearm holders 120 are shown as securing a plurality of firearms 106 horizontally. However, in other embodiments, the firearm holders 120 may be configured to secure one or more firearms 106 vertically or at another orientation. Other embodiments are also possible.

In the illustrated example, each of the firearm holders 120 includes a stock lock 102 including a first jaw and a second jaw coupled at a proximal end by a pivot pin. The first jaw may pivot about the pivot pin relative to the second jaw to open and close around a stock of a firearm 106. The first jaw may couple to the second jaw at a distal end via a locking mechanism to secure the firearms 106. Other implementations are also possible.

Figure 3A:
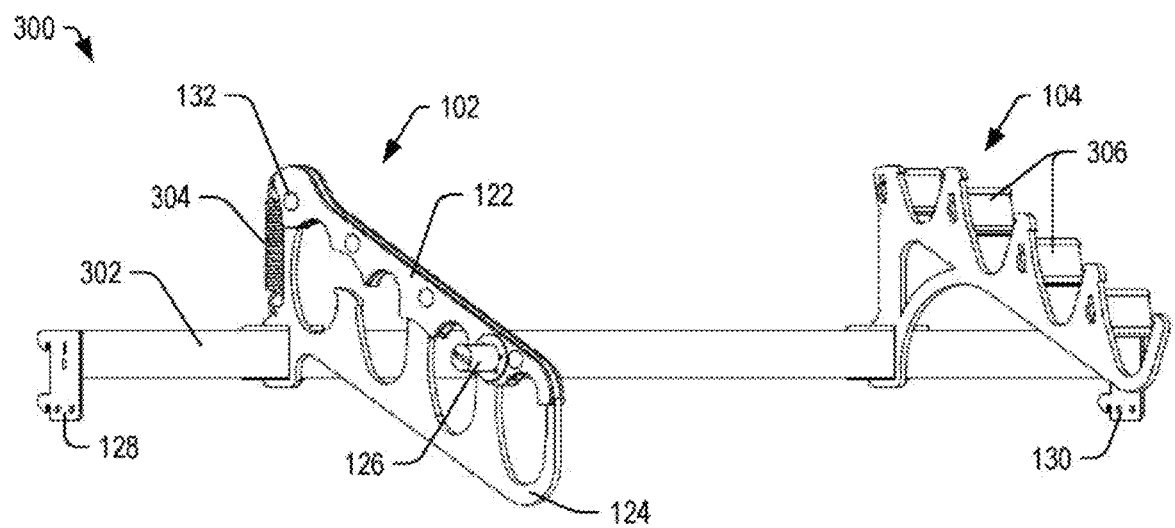
FIGS. 3A and 3B depict a firearm holder including a locking mechanism in a closed state and an open state, respectively, in accordance with certain embodiments of the present disclosure.
Figure 3B:
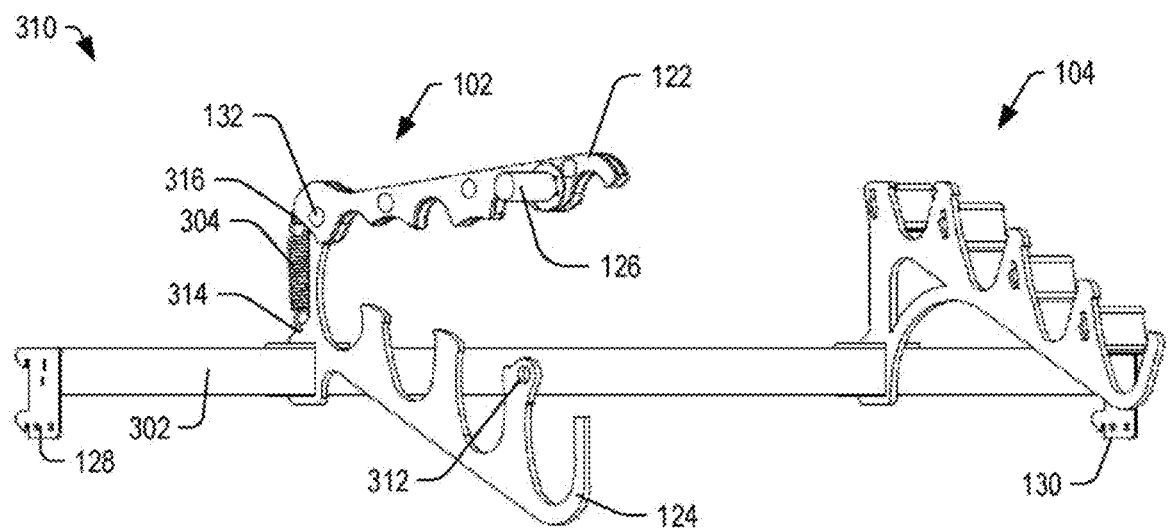

FIGS. 3A and 3B depict a firearm holder 300 in a closed state and an open state, respectively, in accordance with certain embodiments of the present disclosure. In FIG. 3A, the plunger pin 126 extends through an opening 312 in the second jaw 124 to secure the first jaw 122 to the second jaw 124. A spring 304 may be coupled between the first jaw 122 and the second jaw 124 to selectively bias the first jaw 122 into an open position relative to the second jaw 124, when the plunger pin 126 is disengaged, by pulling the first jaw 122 into an open position relative to the second jaw 124 about the pivot pin 132.

The firearm holder 300 may include a member 302 extending between the first mounting element 128 and the second mounting element 130. The member 302 may be a steel bar, a metal structure, a carbon fiber element, another member, or any combination thereof, which may secure the member 302 to a structure, such as the cabinet 108 in FIGS. 1A and 2 A. The stock lock 102 may be coupled to the member 302 near the first mounting element 128, and the holder element 104 may be coupled to the member 302 near the second mounting element 130.

In the illustrated example, the holder element 104 may include a plurality of contact pads 306, where each contact pad 306 is configured to cradle the muzzle 107 of the firearm 106. The contact pads 306 may include a surface coating, such as rubber, fabric, or other covering materials or substances, which may prevent the holder element 104 from scratching the muzzles 107. Other implementations are also possible.

The first mounting element 128 and the second mounting element 130 may be configured to engage slots or openings in a supporting structure to secure the firearm holder 300 in a desired orientation, such as a horizontal orientation, a vertical orientation, or another orientation. In some implementations, the first mounting element 128 and the second mounting element 130 may be fixed to a structure by one or more fasteners, such as screws. Other implementations are also possible.

In FIG. 3B, the view 310 depicts the stock lock 102 in an unlocked and open position. The spring 304 may be configured to bias the first jaw 122 into an open position relative to the second jaw 124. When the plunger pin 126 is retracted and withdrawn through the opening 312, the first jaw 122 can be released from the second jaw 124, and the spring 304 can retract, raising the first jaw 122 relative to the second jaw 124. In this example, the spring 304 may be coupled between a first opening 314 in the second jaw 124 and a second opening 316 in the first jaw 122.

In the illustrated example of FIG. 3B, the first jaw 122 is depicted as pivoting about a pivot pin 132 or axis in a vertical direction, away from the second jaw 124. In some embodiments (such as those depicted in FIGS. 9-16), the first jaw 122 may also be configured to rotate or pivot in a second direction away from or toward the muzzle holder 104. Other implementations are also possible.

Figure 4A:
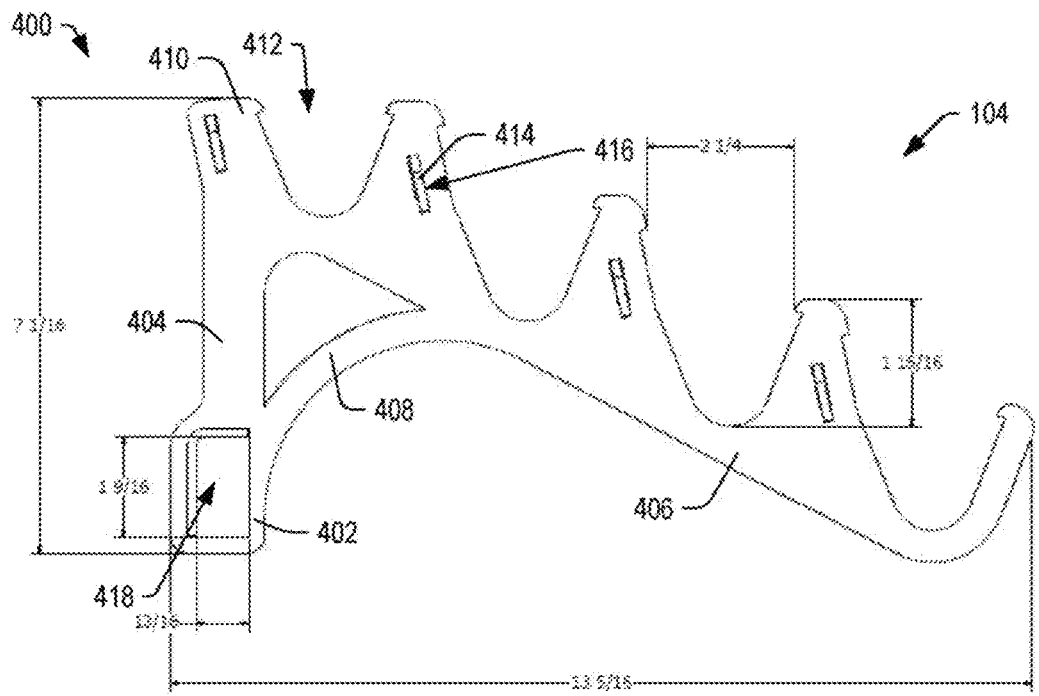
FIG. 4A depicts a side view of a muzzle holder portion of a firearm holder to support a muzzle of a firearm, in accordance with certain embodiments of the present disclosure.

FIG. 4A depicts a side view 400 of a muzzle holder 104 of a firearm holder 120, in accordance with certain embodiments of the present disclosure. The muzzle holder 104 may include a mounting portion 402 configured to couple to the member 302. The muzzle holder 104 may also include a vertical portion 404 extending from the mounting portion 402 to a first ridge 410, a sloped portion 406 extending at an acute angle relative to the vertical member 404, and a support member 408 forming an arch and coupling the vertical member 404 and the sloped portion 406.

In the illustrated example, the muzzle holder 104 may include a plurality of ridges 410 separated by depressions or muzzle-receiving areas 412. Each muzzle-receiving area 412 may be configured to receive and support a muzzle 107 of a firearm 106. Each depression or muzzle-receiving area 412 may include or may be associated with a contact pad 306, which may be covered or coated to prevent scratching of the barrel or muzzle of a firearm 106.

Figure 4B:
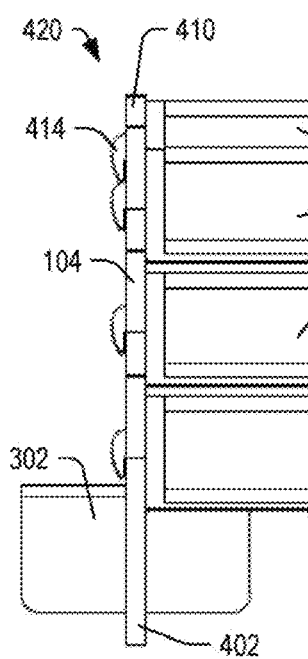
FIG. 4B depicts a front view of the muzzle holder portion of the firearm holder of FIG. 4A, in accordance with certain embodiments of the present disclosure.

FIG. 4B depicts a front view 420 of the muzzle holder 104 of FIG. 4A, in accordance with certain embodiments of the present disclosure. The muzzle holder 104 includes the mounting portion 402 coupled to the member 302. Further, the muzzle holder 104 may include contact pads 306 including hooks or clips 414 that extend through openings 416 in the sloped portion 406 of the muzzle holder 104 to secure the contact pads 306 to the sloped portion 406.

Figure 4C:
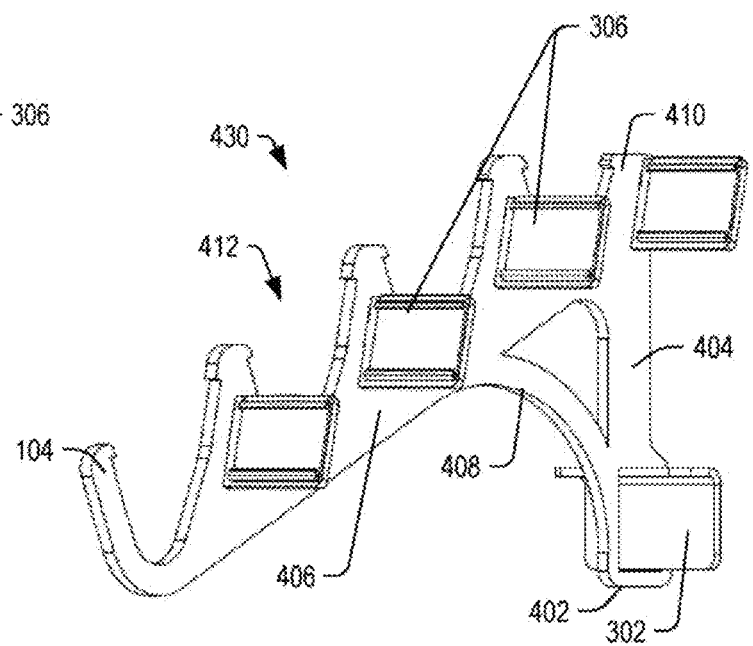
FIG. 4C depicts a perspective view of the muzzle holder portion of the firearm holder of FIG. 4A, in accordance with certain embodiments of the present disclosure.

FIG. 4C depicts a perspective view 430 of the muzzle holder 104 of FIG. 4A, in accordance with certain embodiments of the present disclosure. The perspective view 430 depicts the contact pads 306, which are arranged at an angle other than perpendicular to the ground and which are configured to support the muzzles 107 of the firearms 106. The recesses 412 and the contact pads 306 may cooperate to balance the muzzle or barrel of the firearm 106. Other implementations are also possible.

Figure 5:
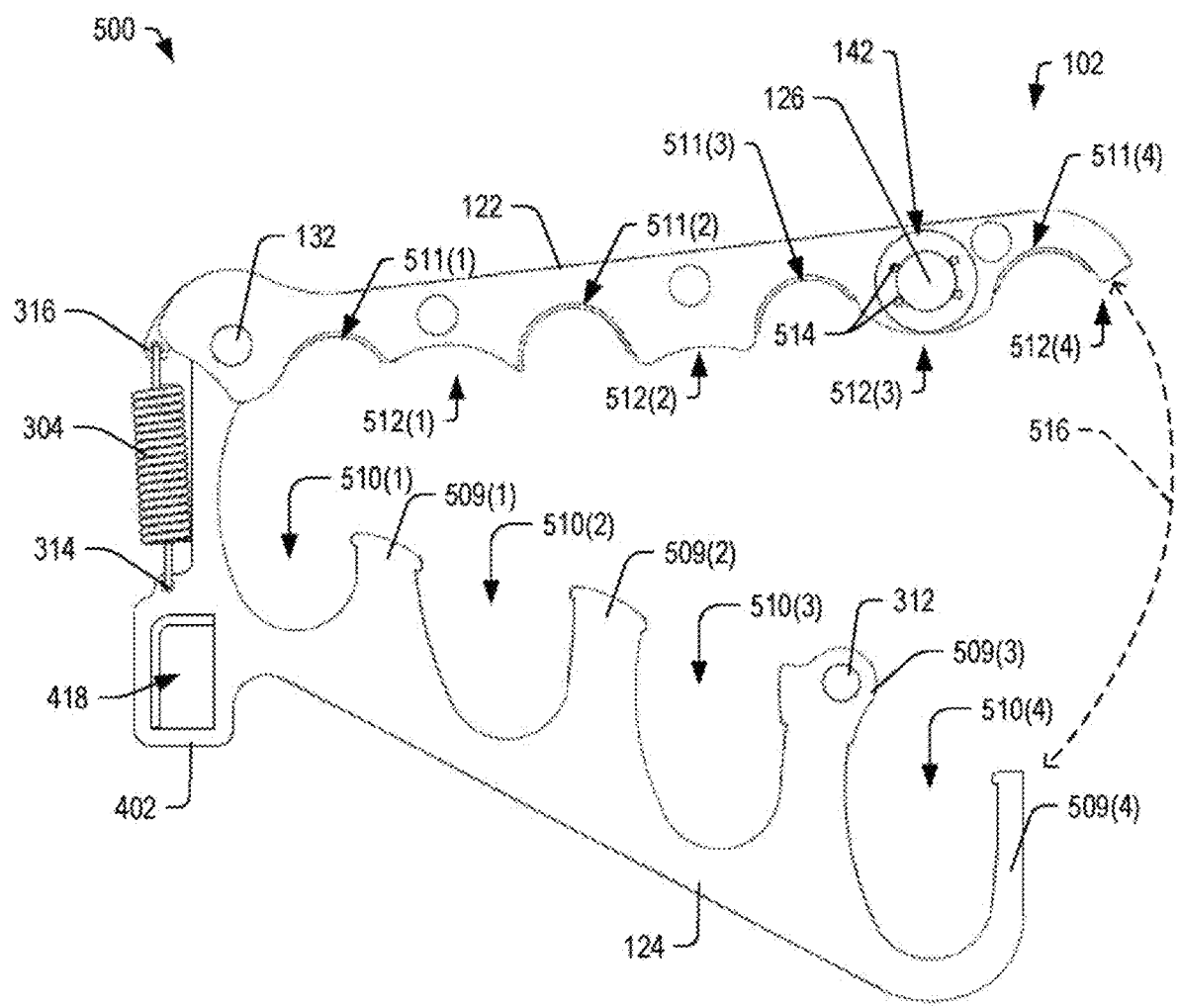
FIG. 5 depicts a side view of a muzzle holder and locking mechanism of a firearm holder of FIGS. 1A-3B and including a spring to bias the stock lock in an open position, in accordance with certain embodiments of the present disclosure.

FIG. 5 depicts a side view 500 of a stock lock 102 of a firearm holder 120 of FIGS. 1A-3B and including a spring 304 to bias the stock lock 102 in an open position, in accordance with certain embodiments of the present disclosure. The stock lock 102 includes the first jaw 122 and the second jaw 124 coupled by a pivot pin 132. In some embodiments, the pivot pin 132 may be rivet, a fastener, a rod, or other type of pin configured to secure the first jaw 122 to the second jaw 124 and defining a pivot axis about which the first jaw 122 may rotate to facilitate opening and closing of the first jaw 122 relative to the second jaw 124. When the stock lock 102 is in a closed state, the spring 304 is in tension. When the plunger lock 126 is unlocked and withdrawn from the opening 312, the spring 304 can contract to move the first jaw 122 about the pivot pin 132 and relative to the second jaw 124.

The second jaw 124 may include a plurality of recesses 510, such as recesses 510(1), 510(2), 510(3), and 510(4). Each recess 510 may be configured to receive a neck of a stock 105 of a firearm 106. The term "neck" may refer to a portion of the stock that is narrower (vertically and/or horizontally as determined from an ordinary orientation of the firearm 106 during operation) than the end of the stock 105 that is furthest from the muzzle 107. In this example, the second jaw 124 is configured to secure the stocks 105 of four different firearms 106; however, the size of the second jaw 124 (and the corresponding size of the muzzle holder 104) may be adjusted to secure more or fewer firearms 106 depending on the depth of the structure (e.g., cabinet 108) configured to house the firearms 106. Other design considerations, such as weight of the firearm holder 120, the weight of the firearms 106, and so on may also influence the size of the firearm holder 120 and the number of firearms 106 that the firearm holder 120 is designed to support.

Further, between the recesses 510, the second jaw 124 may include raised areas or ridges 509(1), 509(2), 509(3), and 509(4). It should be appreciated that the recess 510(1) and the ridge 509(1) may be smaller than the recess 510(2) and the ridge 509(2). The recess 510(3) may be approximately equal in depth relative to the recess 510(2), but the ridge 509(3) may be larger than the ridge 509(2) in order to accommodate the opening 312 for the plunger 142 of the plunger lock 126. The ridge 509(4) may be thinner than the ridges 509(1)-509(3) in a direction relative to the length of the second jaw 124. Other embodiments are also possible.

The first jaw 122 includes corresponding recesses 511(1), 511(2), 511(3), and 511(4), each of which may be configured to fit over an upper portion of a stock 105 of a firearm 106. Between the recesses 511, the first jaw 122 may include ridges 512(1), 512(2), 512(3), and 512(4) extending vertically toward the second jaw 124. It should be appreciated that the angle of separation between the first jaw 122 and the second jaw 124 may be limited by the relative position of an adjacent holding element (i.e., another first jaw 122 and second jaw 124 combination. Accordingly, the ridge 512(1) may be smaller and have less material than the ridge 512(2) to allow for removal and replacement of a firearm 106 into the recess 510(1) when the holding element is open. The ridge 512(3) may be larger than the recess 512(2) in order to accommodate the plunger lock 126. The ridge 512(4) may be smaller than the other ridges 512(1)-512(3) and may be sized to fit with the ridge 509(4) of the second jaw 124. Other embodiments are also possible.

In general, it should be appreciated that the orientation and position of the second jaw 124 may be fixed by its attachment to the member 302 via opening 504. Accordingly, the first jaw 122 may move about the pivot pin 132 and relative to the second jaw 124 to open and close as indicated by the dashed arc 516. The plunger lock 126 and its plunger 142 can be selectively retracted and extended through the opening 312 to lock the first jaw 122 to the second jaw 124 in a closed state. Additionally, the plunger lock 126 may be fastened to the first jaw 122 by fasteners (the ends of which are generally indicated at 514), such as threaded screws, rivets, and the like. In use, the position of the firearms 106 in the recesses 510(4) and 510(3) prevent access to the threaded screws.

The mounting portion 402 of the stock lock 102 includes an opening 418 sized to receive a steel rod or structural member 302. The member 302 may be coupled between the stock lock 102 and the muzzle support 104. A spring 304 may be coupled between an opening 314 in the second jaw 124 and opening 316 in the first jaw 122.

The first jaw 122 includes a locking mechanism 142 with a plunger 126 that may be retracted to open the stock lock 102, allowing the first jaw 122 to open relative to the second jaw 124. The plunger 126 may extend through the opening 312 in the second jaw 122. In an alternative embodiment, the opening 312 may be formed in the first jaw 122, and the lock mechanism 142 and plunger 126 may be coupled to the second jaw 124. Other implementations are also possible.

Figure 6:
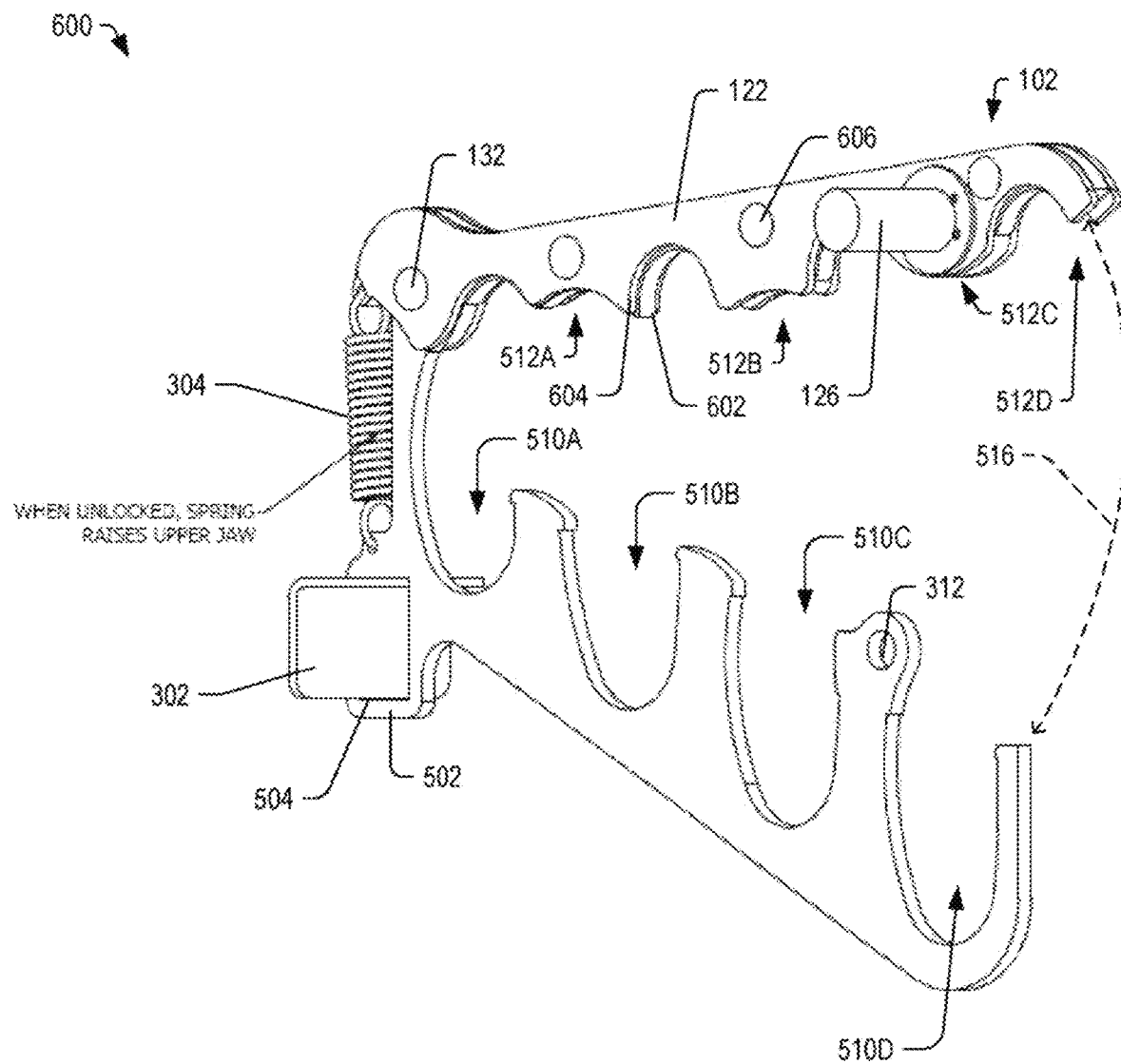
FIG. 6 depicts a perspective view of the muzzle holder and locking mechanism of FIG. 5 in an open state.

FIG. 6 depicts a perspective view of the stock lock of FIG. 5. In this view, the first jaw 122 may be formed from a pair of elements 602 and 604 separated by a space sized to receive the ridges 509. Further, the elements 602 and 604 may be coupled to one another by the pivot pin 132 and rivets, such as the rivet 606. Other embodiments are also possible.

In the illustrated example, a portion of the member 302 is depicted as extending through the opening 418 within the mounting portion 408 of the firearm holder 120. In this example, the plunger 126 is withdrawn from the opening 312 to allow the first jaw 122 to pivot relative to the second jaw 124 about the axis defined by the pivot pin 132. The spring 304 biases or raises the first jaw 122.

Figures 7A, 7B, 7C:
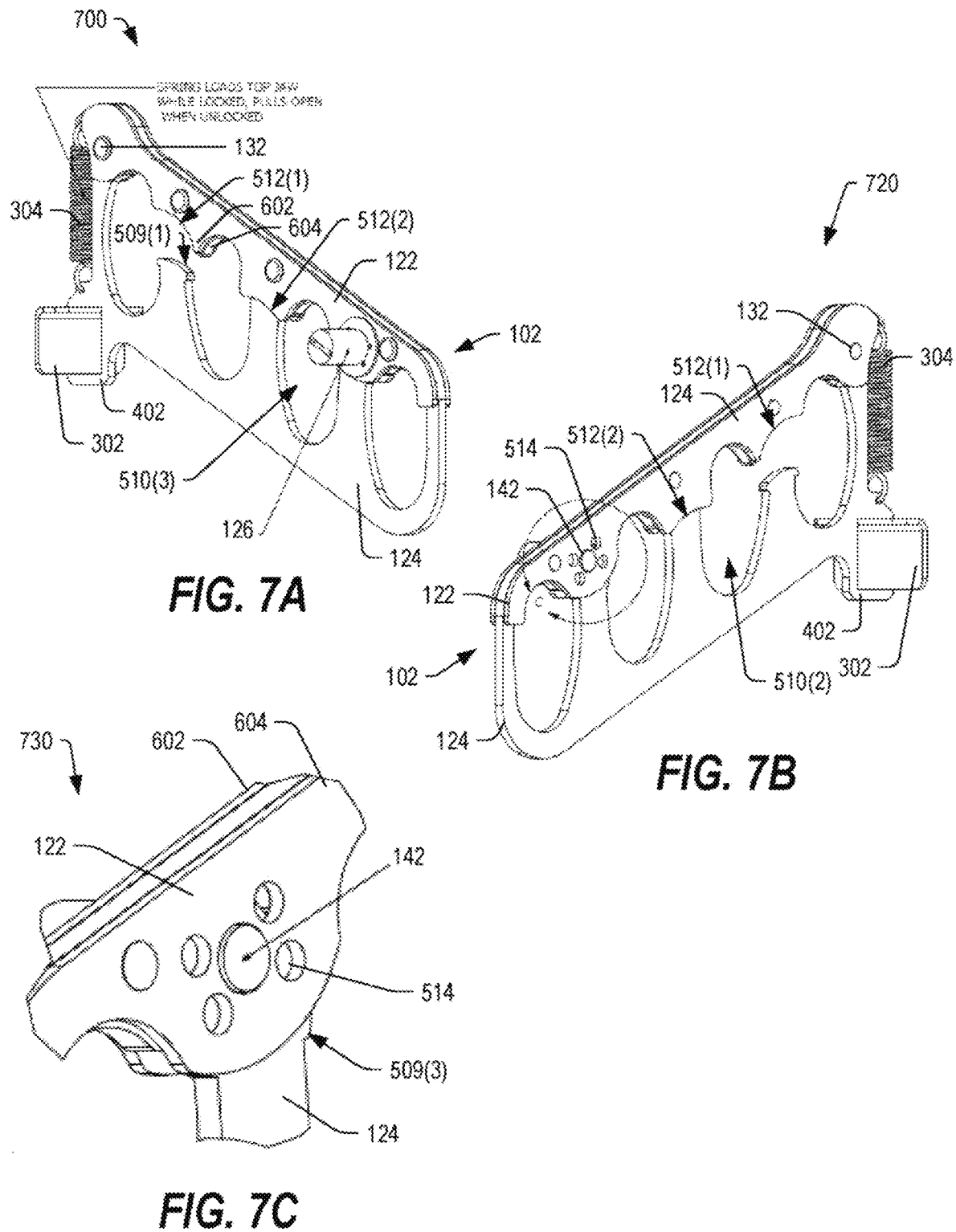
FIG. 7A depicts a left side perspective view of the muzzle holder of FIGS. 1A-3B, 5 and 6 including a plunger lock, in accordance with certain embodiments of the present disclosure.
FIG. 7B depicts a right-side perspective view of the muzzle holder of FIG. 7A including a rear view of the plunger lock, in accordance with certain embodiments of the present disclosure.
FIG. 7C depicts an expanded rear view of the plunger lock of FIG. 7B, in accordance with certain embodiments of the present disclosure.

FIG. 7A depicts a left side perspective view 700 of the stock lock 102 of FIGS. 1A-3B, 5 and 6 including a plunger lock 126, in accordance with certain embodiments of the present disclosure. In the illustrated example, the first jaw 122 is closed over the second jaw 124, and the plunger 126 is extended through the opening 312 (which is not visible). In this example, the ridges 509(2), 509(3), and 509(4) extend between the sides 602 and 604 of the first jaw 122. To allow for removal of a firearm 106 from the recess 510(1) when the first jaw 122 is open, the ridge 509(1) and the ridge 512(1) may be smaller than adjacent ridges 509(2), 509(3), 509(4), 512(2), 512(3), and 512(4), such that the is an air gap between the ridges 509(1) and 512(1) when the first jaw 122 is closed.

FIG. 7B depicts a right-side perspective view 720 of the stock lock 102 of FIGS. 1A-3B and 5-7 including the plunger lock 142, in accordance with certain embodiments of the present disclosure. In this example, the recessed openings 514 of the stock lock 102 are visible.

FIG. 7C depicts an expanded view 730 of the plunger lock 142 of FIG. 7B, in accordance with certain embodiments of the present disclosure. The plunger lock 142 includes a ridge 509(3) extending between the sides 602 and 604 of the first jaw 122. The ridge 509(3), as previously mentioned, includes the opening 312 through which the plunger 126 of the plunger lock 142 extends to lock the first jaw 122 closed relative to the second jaw 124. Other embodiments are also possible.

In the illustrated example, the plunger lock 142 may be attached to the first jaw 122 by threaded fasteners or rivets generally indicated at 514. The plunger lock 142 may include the plunger 126 configured to extend through the opening 312 to secure the distal end portions of the first jaw 122 and the second jaw 124.

Figure 8:
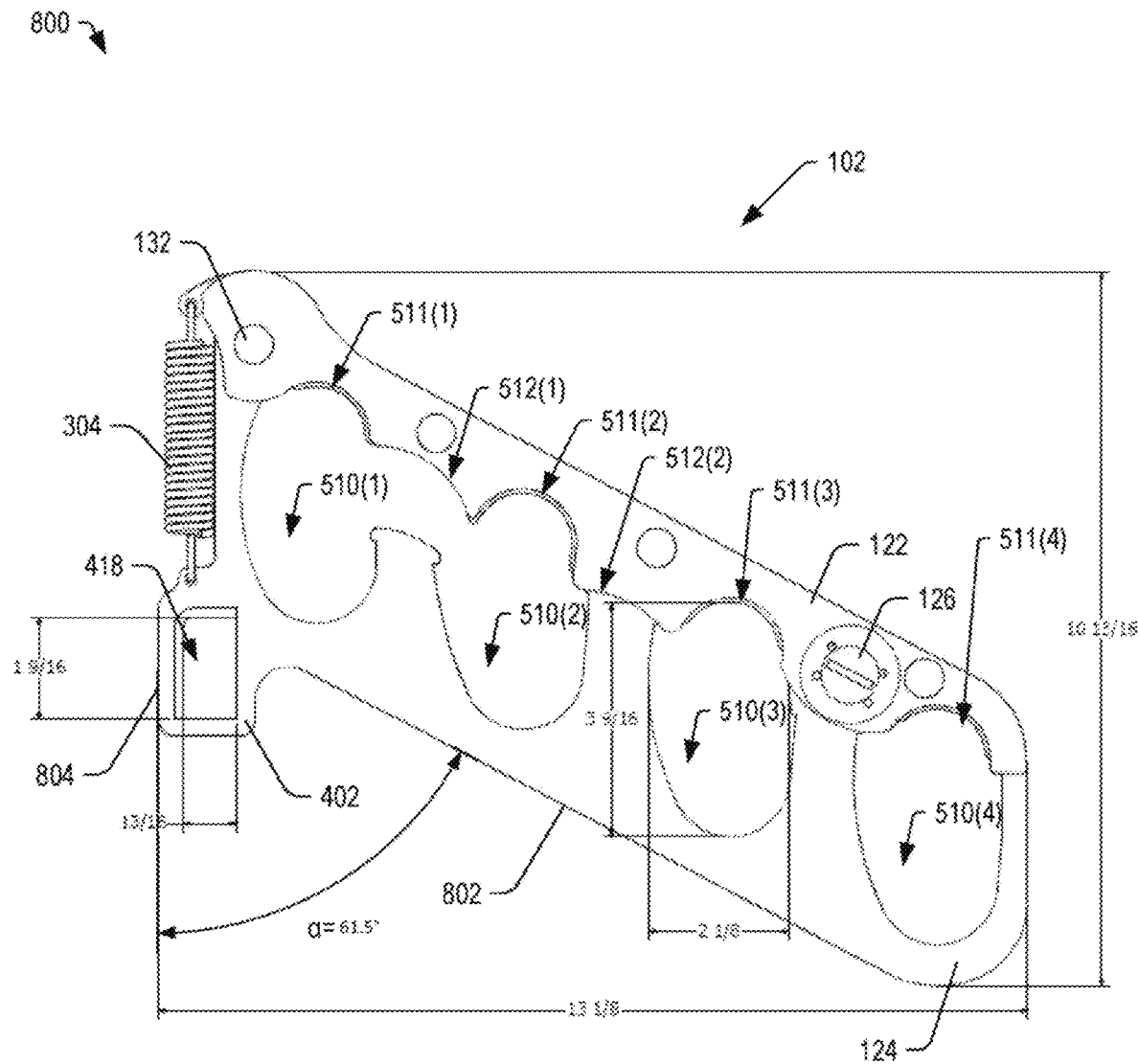
FIG. 8 depicts the muzzle holder of FIGS. 1A-3 and 5-7 and including dimensional information corresponding to one implementation, in accordance with certain embodiments of the present disclosure.

FIG. 8 depicts a side view 800 of a stock lock 102 including dimensional information according to one implementation. In the illustrated example, the stock lock 102 includes the first jaw 122 and the second jaw 124 in a closed position, with the plunger 142 engaged to secure the first jaw 122 in a closed state.

In the illustrated example, each of the recessed areas 510 and 511 may be paired or aligned to form an enclosure sized to receive the "neck" portion of a stock 105 of a firearm 106. The enclosures are approximately equal in size, where each enclosure has a height of approximately 3 and 9/16 inches and a width of approximately 2 and 1/8 inches.

The opening 418 may be sized to receive the member 302. The memory 418 is depicted as having a height of 1 and 9/16 inches and a width of 13/16 inches. Further, in this example, the second jaw 124 defines a sloped portion 802 defining an angle (a), which in this case is approximately 60.5 degrees relative to a vertical portion 804. The length of the second jaw, the angle (a), and a height of the vertical portion 804 of the second jaw 124, plus a portion of the first jaw 122 that extends above the pivot pin 132 may cooperate to determine a height of the stock lock 102, which in this example is 10 and 13/16 inches. The length or distance that the stock lock 102 extends from the supporting structure (e.g., the cabinet 308) is shown to be approximately 13 and 1/8 inches. Other dimensions are also possible.

The illustrated example of FIG. 8 is designed to support up to four firearms 106, locking their respective stocks 105 between the first jaw 122 and the second jaw 124. However, in other implementations fewer or more recesses may be provided to enable securing of a greater number or a lesser number of firearms 106. Other implementations are also possible.

Figure 9:
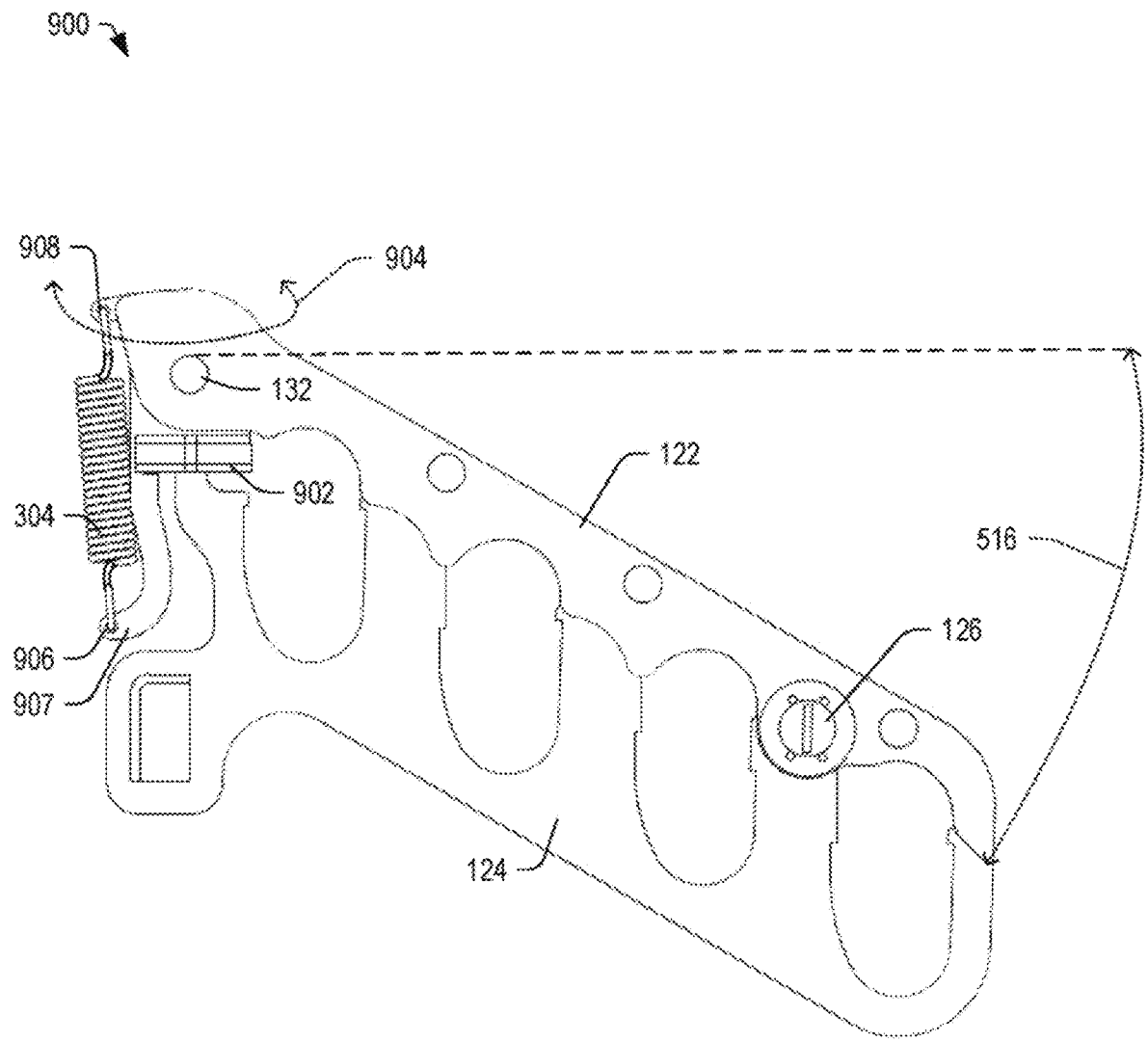
FIG. 9 depicts a side view of a muzzle holder including a pivot pin and a swivel assembly configured to enable the first jaw to pivot about the pivot pin and to rotate about an axis of the swivel, in accordance with certain embodiments of the present disclosure.

FIG. 9 depicts a side view of a stock lock 900 including a pivot pin 132 and a swivel assembly 902 configured to enable the first jaw 122 to pivot about the pivot pin 132 and to rotate about an axis of the swivel assembly 902, in accordance with certain embodiments of the present disclosure. The stock lock 900 includes all the elements of the stock lock 102 of FIGS. 1A-3 and 5-8, except that the spring 304 is coupled between openings 906 and 908. The opening 906 may be part of an arm 907 of the swivel assembly 902, and the opening 908 may be formed in the first jaw 122. The pivot pin 132 may extend through an opening in the first jaw 122 and through an opening (opening 1506 in FIG. 15B) in a portion of the swivel assembly 902. The spring 304 may cooperate with the pivot pin 132 to cause the first jaw 122 to pivot about the pivot pin 132 as indicated by the dashed arrow 516 relative to the second jaw 124.

In some embodiments, a swivel plate of the swivel assembly 902 may be coupled to the second jaw 124. The swivel plate may interlock with a pocket or opening within the swivel assembly 902. The pocket may allow the housing of the swivel assembly 902 to turn relative to the swivel plate and relative to the second jaw 124, allowing the first jaw 122 to turn or rotate (as indicated by the arrow 904) about a swivel axis that is substantially perpendicular to a pivot axis defined by the pivot 132.

In the illustrated example, the stock lock 900 may be configured to allow the first jaw 122 to open relative to the second jaw 124 by pivoting about the pivot pin 132. Further, the first jaw 122 may be configured to rotate about an axis defined by the swivel assembly 902 to allow the first jaw 122 to turn relative to the second jaw 124 as indicated by the dashed arrow 904. Other embodiments are also possible.

Figure 10:
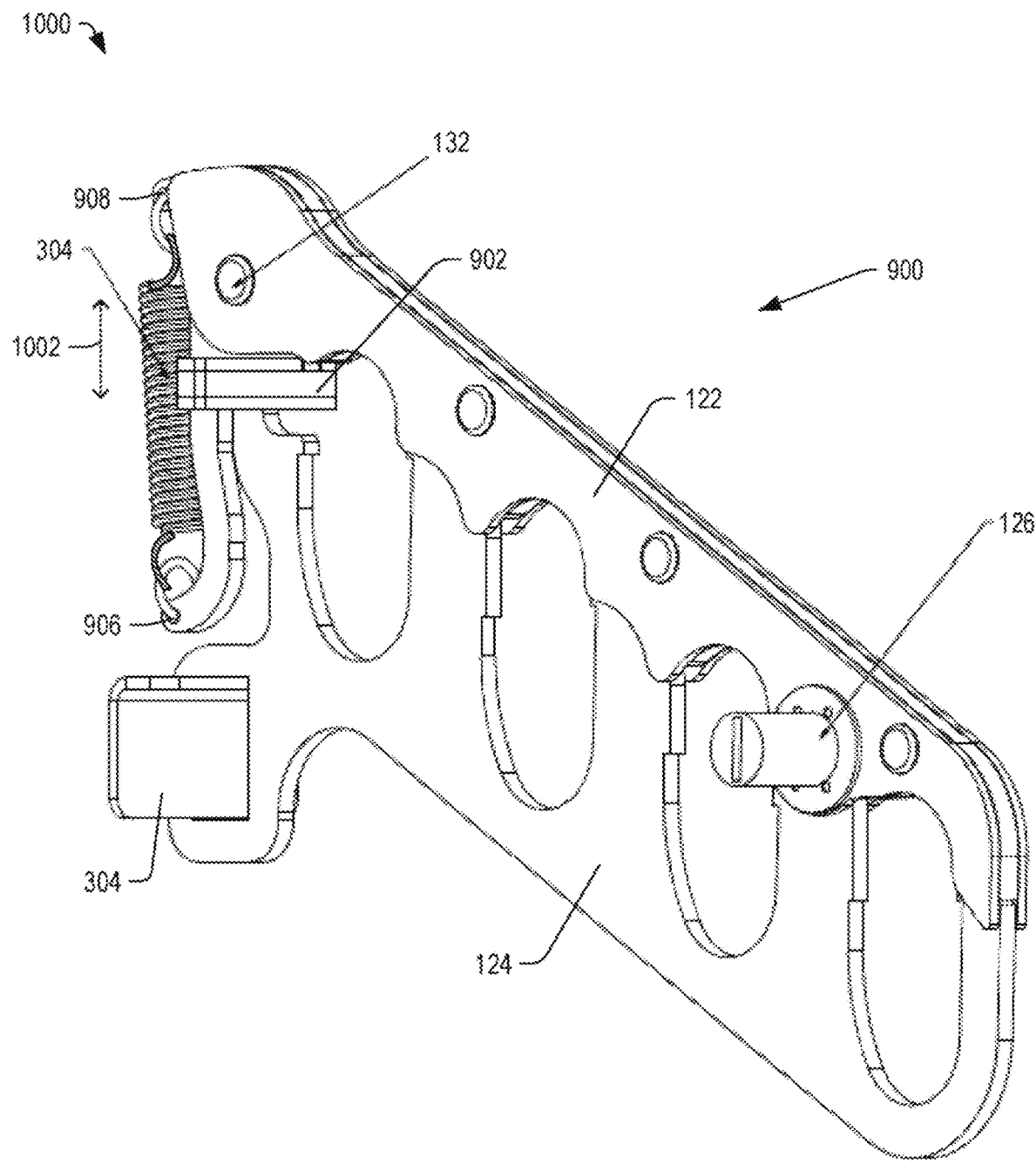
FIG. 10 depicts a perspective view of the muzzle holder of FIG. 9 in a closed and locked state.

FIG. 10 depicts a perspective view 1000 of the stock lock 900 of FIG. 9 in a closed and locked state. Once the first jaw 122 is open relative to the second jaw 124, the first jaw 122 and a portion of the swivel assembly 902 may move vertically as indicated by the dashed line 1002. Once the first jaw 122 and the portion of the swivel assembly 902 are elevated, the first jaw 122 may be rotated about an axis defined by the swivel assembly 902. Other embodiments are also possible.

In the illustrated example of FIG. 10, the spring 304 is in tension. When the plunger lock 126 is opened to decouple the first jaw 122 from the second jaw 124, the spring 304 may retract, releasing the tension and opening the first jaw 122 relative to the second jaw 124. Other embodiments are also possible.

Figure 11:
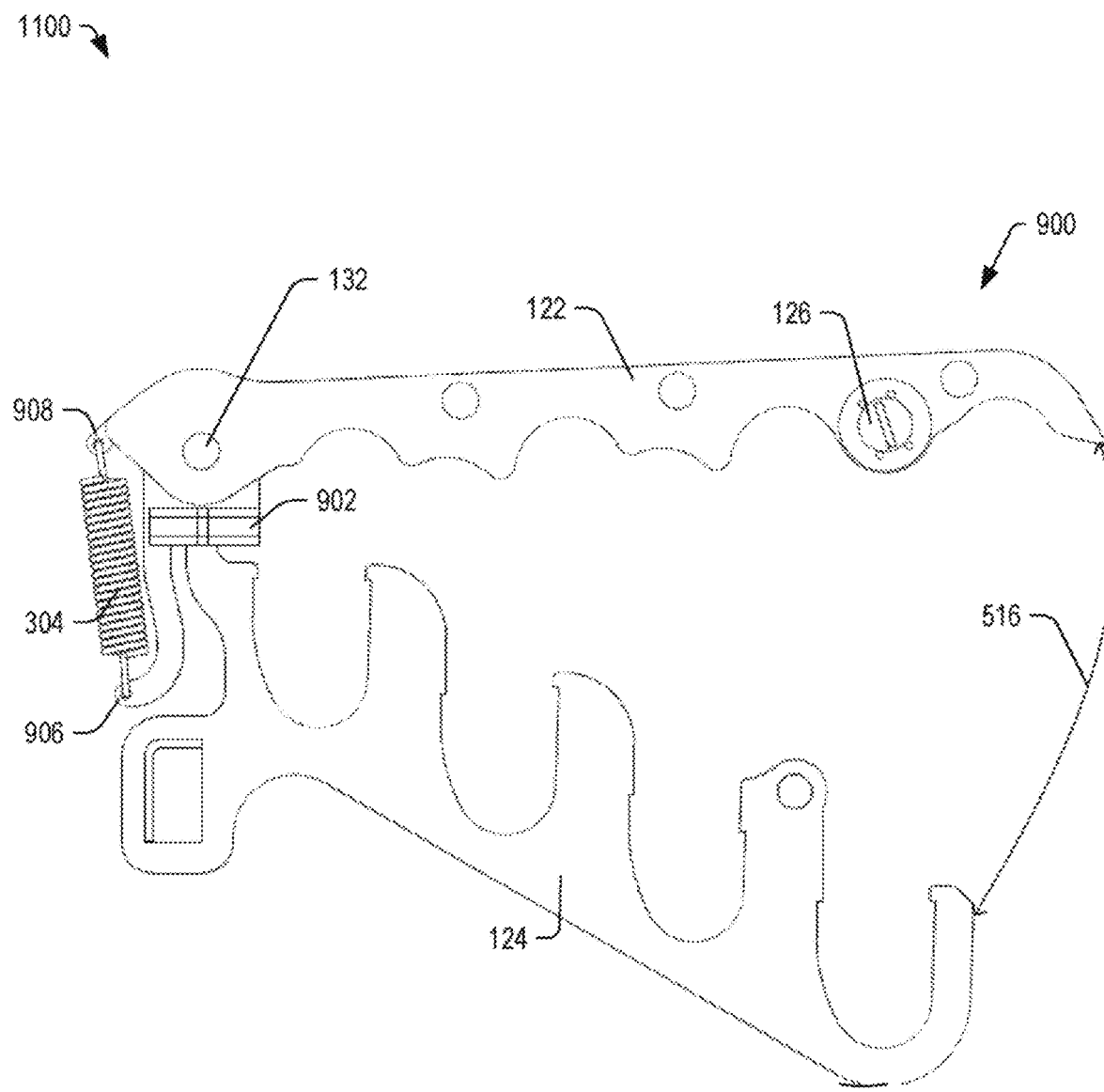
FIG. 11 depicts a side view of the muzzle holder of FIG. 9 in an open and unlocked state.

FIG. 11 depicts a side view 1100 of the stock lock 900 of FIG. 9 in an open and unlocked state. In this state, the first jaw 122 is open relative to the second jaw 124 such that the first jaw 122 is rotated about the pivot pin 132. In this state, the first jaw 122 and a portion of the swivel assembly 902 are elevated, enabling rotation of the first jaw 122 about a swivel axis.

Figure 12:
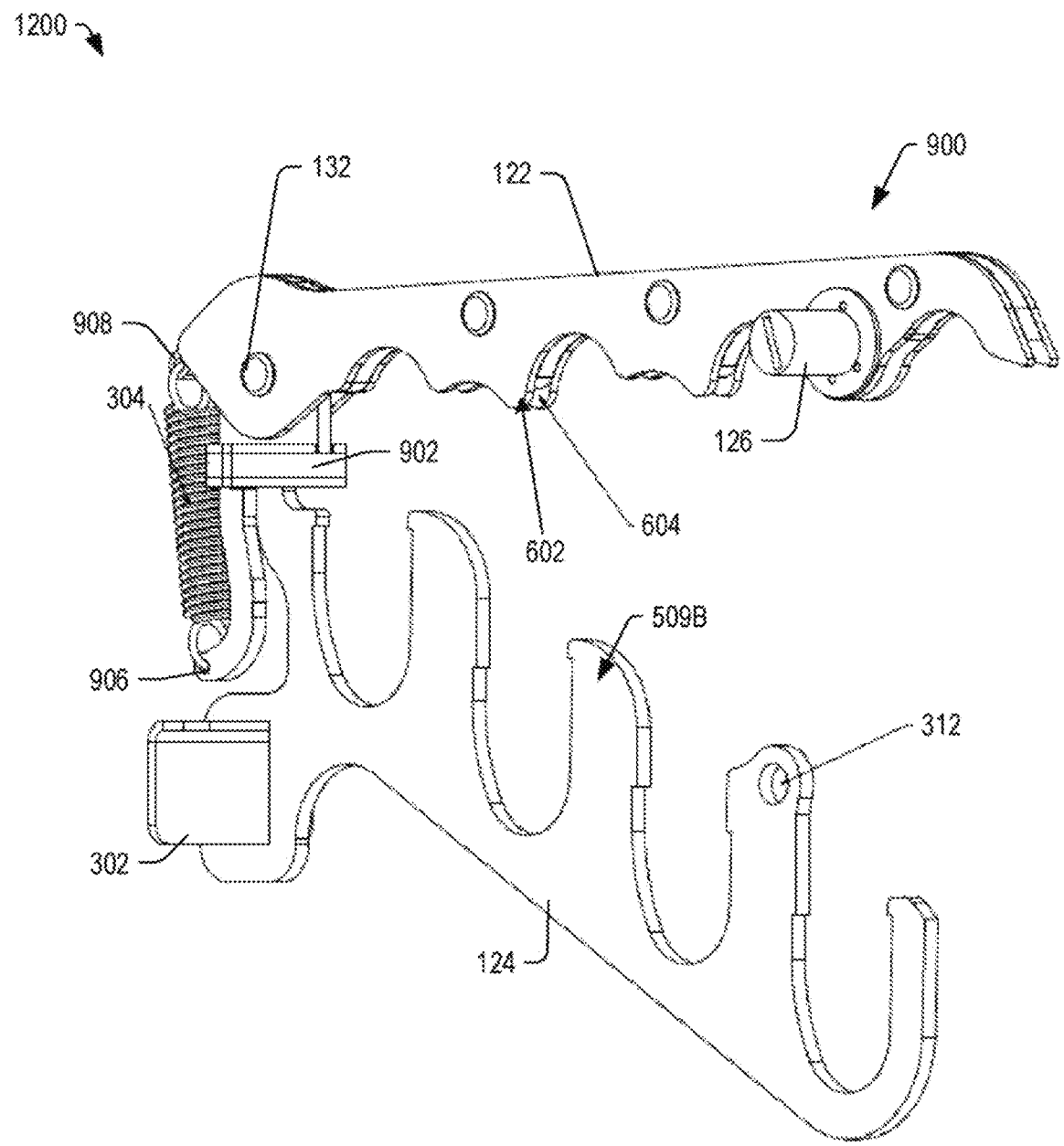
FIG. 12 depicts a perspective view of the muzzle holder of FIG. 9 in an open and unlocked state and with the first jaw swiveled relative to the second jaw.

FIG. 12 depicts a perspective view 1200 of the stock lock 900 of FIG. 11 in the open and unlocked state. In this state, the elements 602 and 604 are shown. The inside element 602 and the outside element 604 overlap the ridge 509(2) when closed. The swivel assembly 902 may enable the first jaw 122 to rotate about a swivel axis defined by the swivel assembly 902 to provide an expanded opening for insertion and/or removal of a firearm 106. Other embodiments are also possible.

Figure 13A:
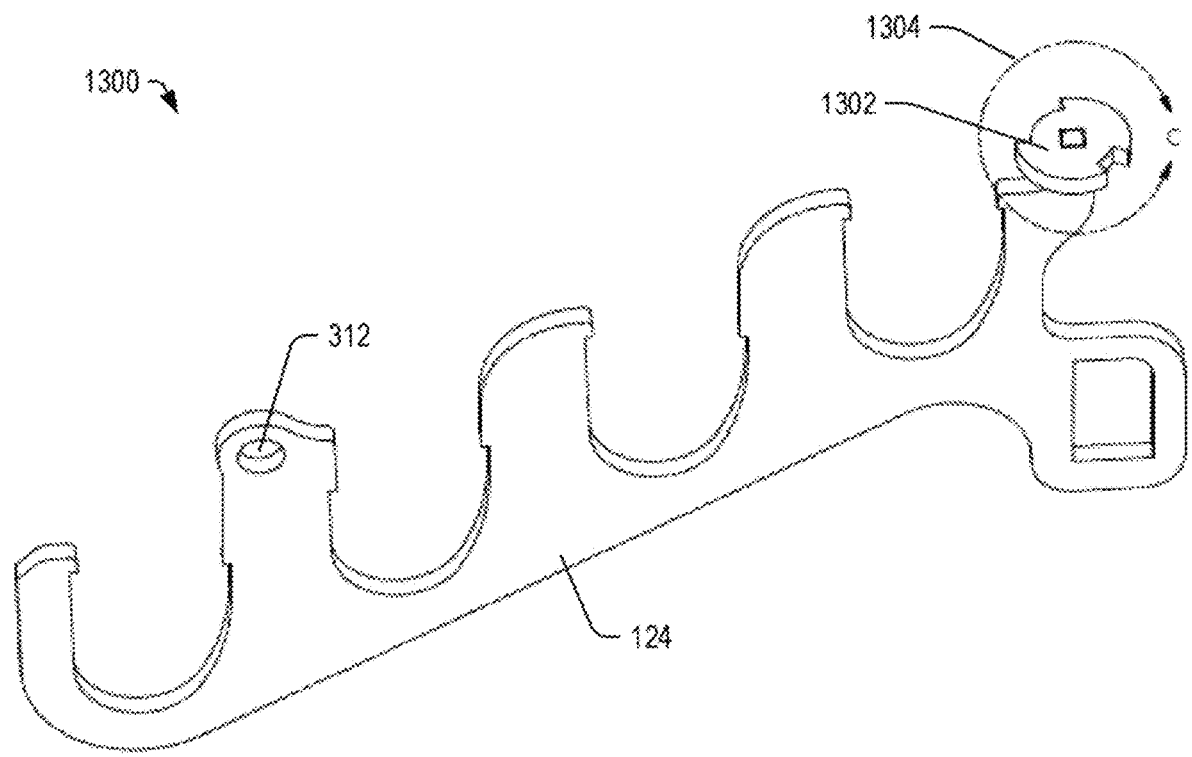
FIG. 13A depicts a perspective view of the second jaw of a stock lock including a swivel plate of the swivel assembly of FIG. 9, in accordance with certain embodiments of the present disclosure.

FIG. 13A depicts a perspective view 1300 of the second jaw 124 of a stock lock 900 including a swivel plate 1302, in accordance with certain embodiments of the present disclosure. The swivel plate 1302 may be a part of the swivel assembly 902 in FIG. 9. The swivel plate 1302 may include notches 1306 and 1308 and a center opening 1310 having a square shape configured to engage a corresponding post 1324 of the second jaw 124. An expanded view of these features is shown in FIG. 13B.

Figure 13B:
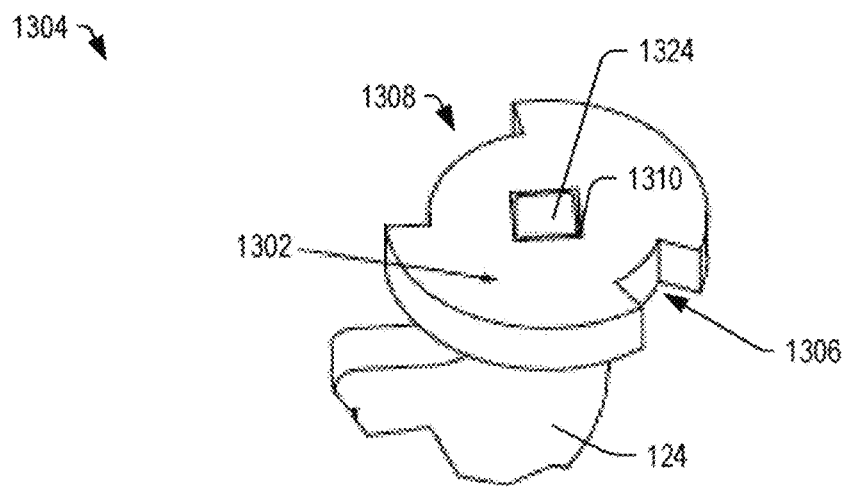
FIG. 13B depicts an expanded view of the swivel plate and a portion of the second jaw of FIG. 13A.

FIG. 13B depicts an expanded view 1304 of the swivel plate 1302 and a portion of the second jaw 124 of FIG. 13A. The swivel plate 1302 includes a small notch 1306 and a large notch 1308 on opposing sides of the swivel plate 1302 to enable insertion into the pocket (pocket 1406 in FIG. 14) of the swivel assembly 902 at a first orientation of the swivel assembly 902 and to prevent extraction of the swivel plate 1302 at a second orientation of the swivel assembly 902. Further, the corresponding shapes of the post 1324 and the opening 1310 prevent the swivel plate 1302 from turning relative to the second jaw 124.

In some embodiments, the swivel plate 1302 may be welded, riveted, or otherwise attached to the second jaw 124. The corresponding shapes of the opening 1310 and the post 1324 may cooperate to support the attachment of the swivel plate 1302 to the second jaw 124.

Figure 14:
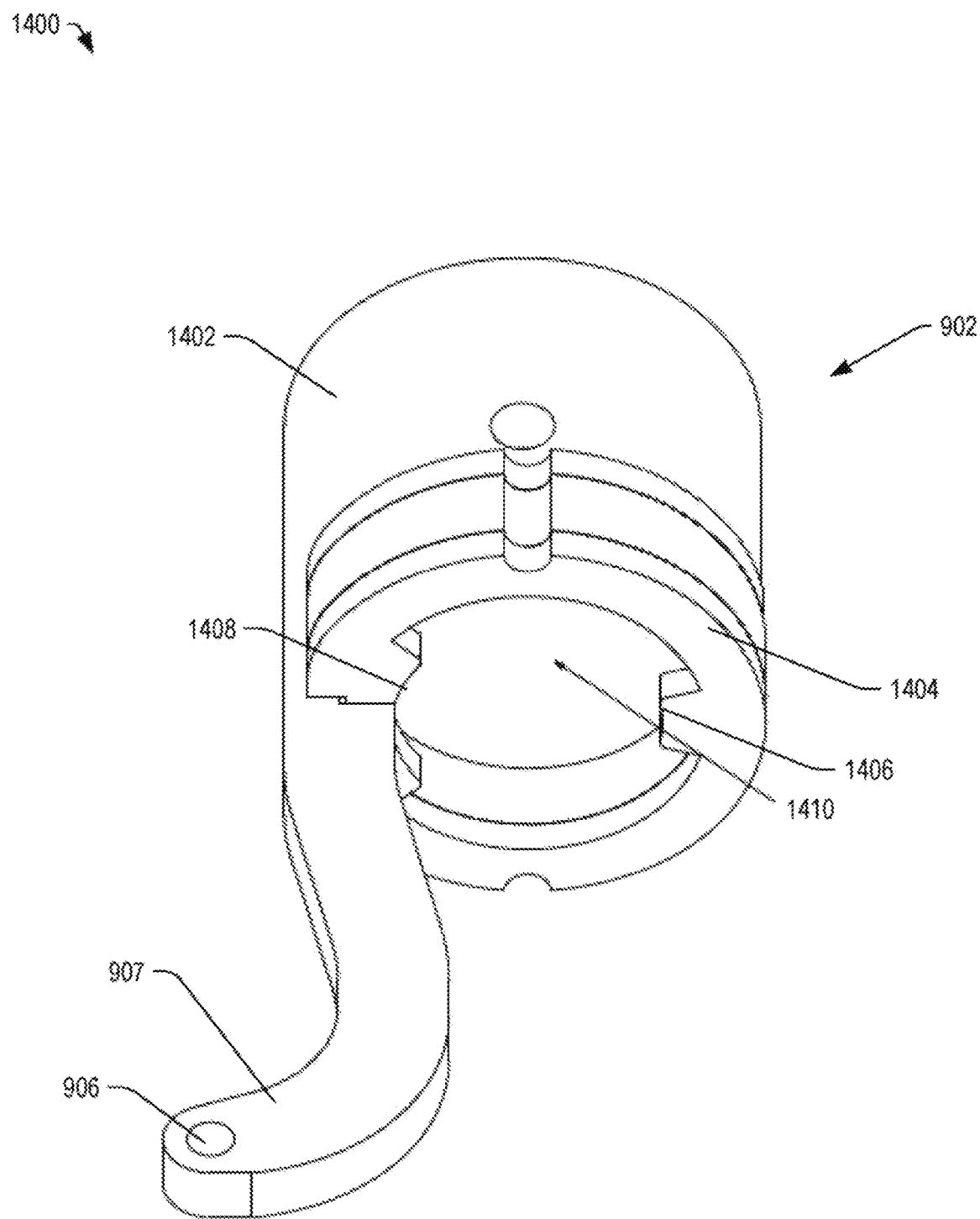
FIG. 14 depicts an upper portion of the swivel assembly of FIG. 9, in accordance with certain embodiments of the present disclosure.

FIG. 14 depicts an upper portion 1400 of the swivel assembly 902 of FIG. 9, in accordance with certain embodiments of the present disclosure. The upper portion 1400 may include a housing 1402 defining a enclosure 1410 (or pocket) sized to receive the swivel plate 1302 of FIG. 13. The housing 1402 further includes the arm 907 including the opening 906 configured to receive an end of the spring 304. The housing 1402 may further include a guide portion 1404 including notches or teeth 1406 and 1408 configured to correspond to the notches 1306 and 1308 of the swivel plate 1302 to allow insertion of the swivel plate 1302 when the housing 1402 is at a first orientation and to prevent removal of the swivel plate 1302 when the housing 1402 is at a second orientation.

Figure 15A:
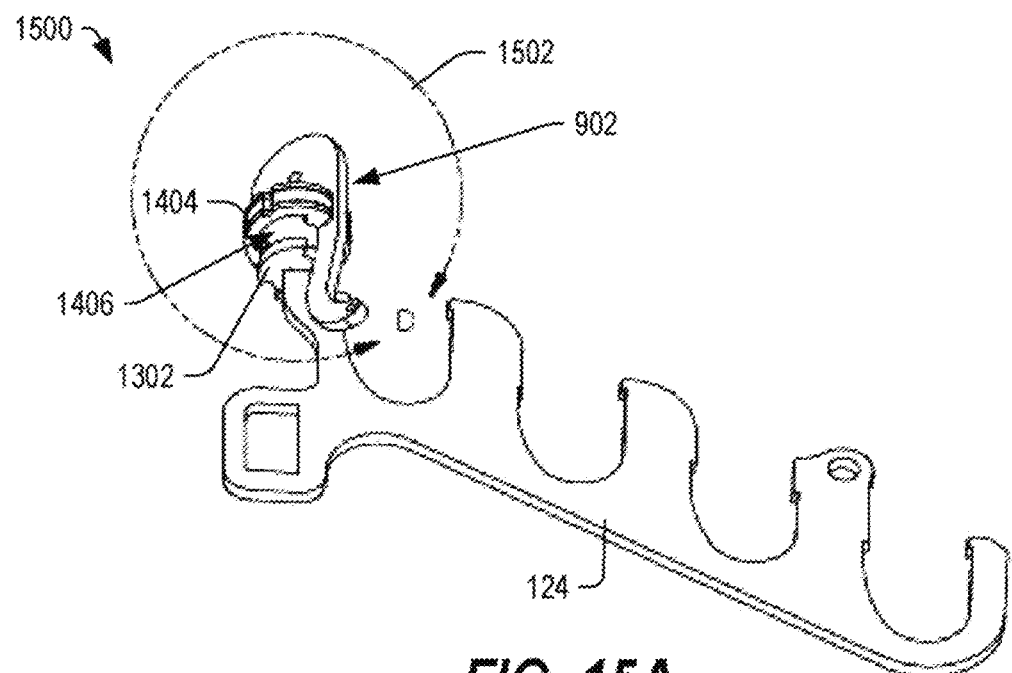
FIG. 15A depicts a portion of the stock lock including the second jaw and a swivel assembly, in accordance with certain embodiments of the present disclosure.

FIG. 15A depicts a portion 1500 of the stock lock 900 of FIG. 9 including the second jaw 124 coupled to the swivel assembly 902, in accordance with certain embodiments of the present disclosure. The swivel assembly 902 includes the guide portion 1404 defining an enclosure 1410 sized to receive the swivel plate 1302 coupled to the second jaw 124.

Figure 15B:
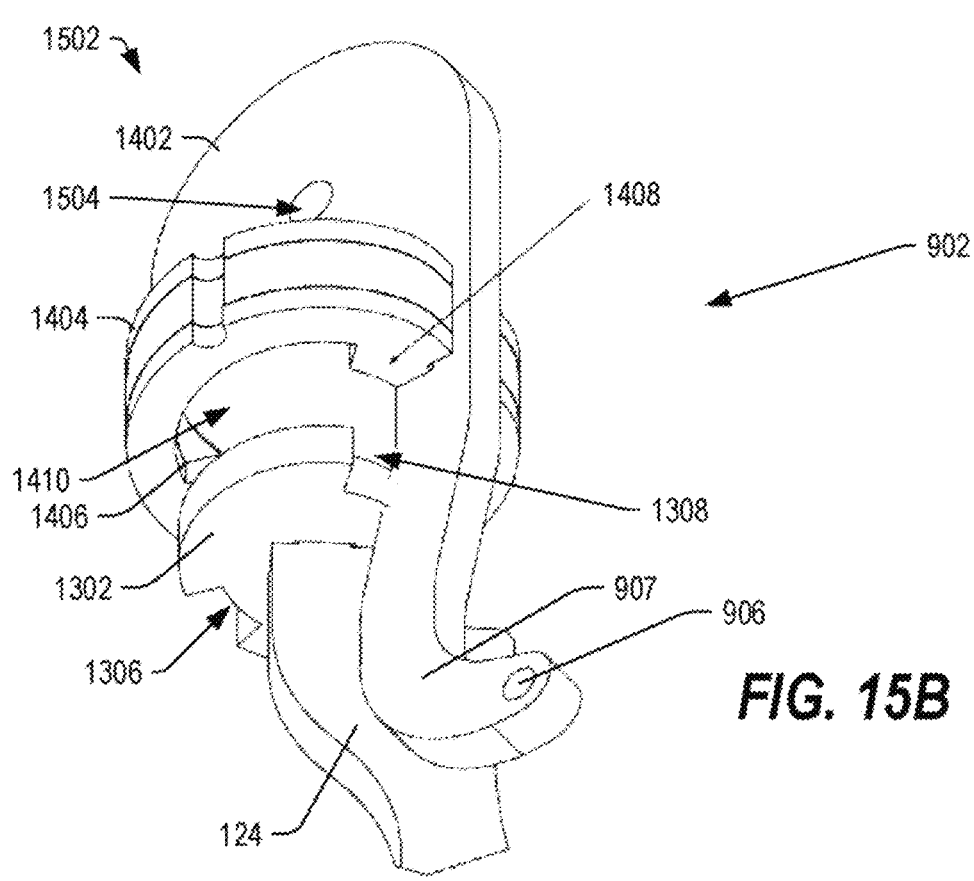
FIG. 15B depicts an enlarged view of the swivel assembly of FIG. 15A.

FIG. 15B depicts an enlarged view 1502 of the swivel assembly 902 of FIG. 15A. In the enlarged view, a portion of the second jaw 124 is shown that is coupled to the swivel plate 1302. The swivel plate 1302 may include notches 1306 and 1308. The guide portion 1404 may include a first notch or ridge 1406 sized to receive the notch 1306 of the swivel plate 1302 and includes a second notch or ridge 1408 sized to receive the notch 1308 of the swivel plate 1302. It should be appreciated that the notches 1306 and 1308 are different sizes, and the notches or ridges 1406 and 1408 are corresponding sizes.

The housing 1402 may include an opening 1504 sized to receive the pivot pin 132 to couple the first jaw 122 to the swivel assembly 902. The housing 1402 further includes an arm 907 including an opening 906 configured to couple to an end of the spring 304.

In this example, the first jaw 122 may pivot about the pivot pin 132 relative to a pivot pin axis defined by the opening 1504. The first jaw 122 may rotate about a swivel axis extending perpendicular to a center of the swivel plate 1302, together with the housing 1402. Accordingly, the swivel assembly 902 operates to enable opening and closing of the first jaw 122 relative to the second jaw 124 and to enable pivoting (turning or swiveling) of the first jaw 122 into and out of alignment with the second jaw 124 to facilitate insertion and removal of firearms 106 from the stock lock 900. Other implementations are also possible.

Figure 16:
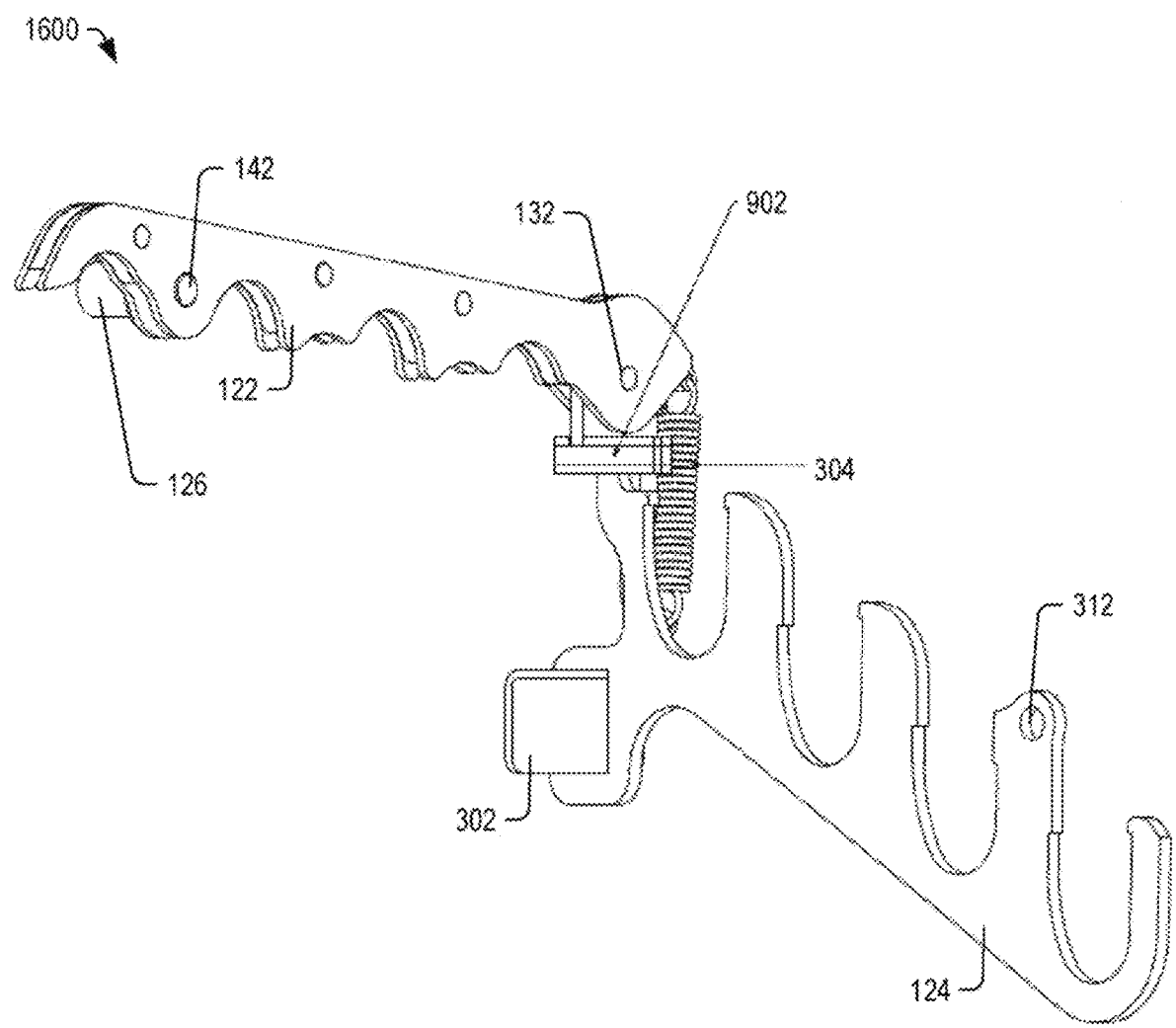
FIG. 16 depicts the muzzle holder of FIG. 9 in an unlocked, open, and swiveled state, in accordance with certain embodiments of the present disclosure.

FIG. 16 depicts the stock lock 900 of FIG. 9 in an unlocked, open, and swiveled state, in accordance with certain embodiments of the present disclosure. In this example, the swivel assembly 902 is elevated relative to the second jaw 124 and the first jaw 122 is opened and swiveled (rotated) relative to the second jaw 124. Other implementations are also possible.

It should be appreciated that the spring 304 swivels or rotates with the first jaw 122 and the arm 907 of the swivel assembly 902. This allows the spring 304 to hold the first jaw 122 open relative to the second jaw 124 without impacting the spring 304 when the first jaw 122 is turned relative to the second jaw 124. Other implementations are also possible.

In the examples of FIGS. 9-16, the stock lock 102 portion of the firearm holder 120 includes a swivel assembly 902 to enable the first jaw 122 to open relative to the second jaw 124. Additionally, the swivel assembly 902 enables the first jaw 122 to rotate (swivel or turn) out of alignment with the second jaw 124. However, the turning or rotating motion of the first jaw 122 may be implemented using a different structure, such as a hinge. An example of an embodiment of the stock lock 102 that includes a hinge is described below with respect to FIG. 17.

Figure 17:
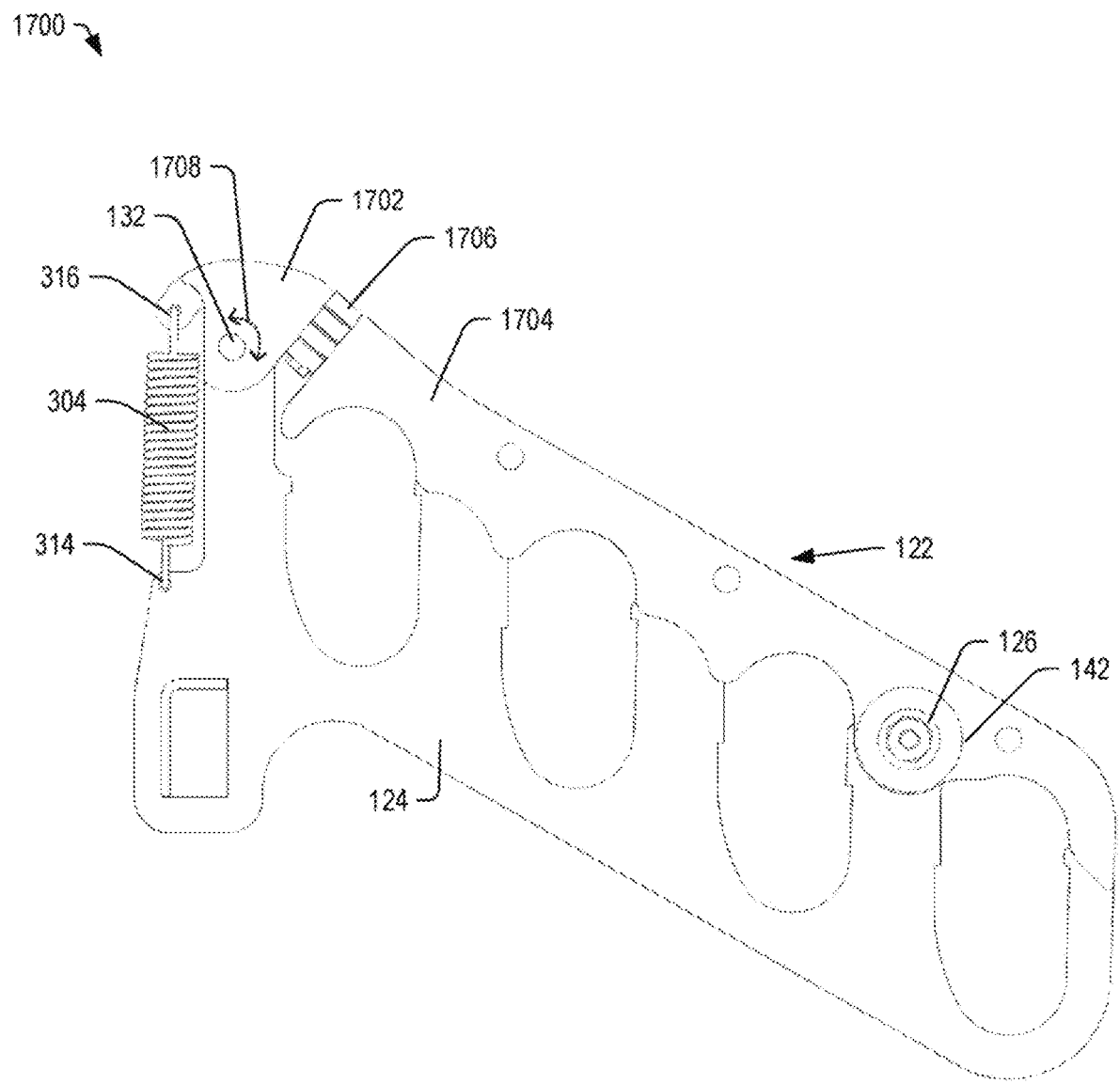
FIG. 17 depicts a muzzle holder including a pivot pin and a hinge assembly configured to enable the first jaw to pivot about the pivot pin and to rotate about an axis of the hinge, in accordance with certain embodiments of the present disclosure.

FIG. 17 depicts a stock lock 1700 including a pivot pin 132 and a hinge assembly 1706 configured to enable the first jaw 122 to pivot about the pivot pin 132 and to rotate about an axis of the hinge 1706 (relative to the second jaw 124), in accordance with certain embodiments of the present disclosure. The first jaw 122 may include a first portion 1702 and a second portion 1704. The first portion 1702 may be coupled to the pivot pin 132 in a mid-portion, may be coupled to the spring 304 on a first side of the pivot pin 132, and may be coupled to the hinge assembly 1706 on a second side. The second portion 1704 of the first jaw 122 may be coupled between the hinge assembly 1706 and the locking mechanism 142 with the plunger 126. In a closed and locked state, the first portion 1702 and the second portion 1704 may form a substantially straight member aligned with and configured to engage the second jaw 124. The first jaw 122, and the first portion 1702, may be configured to pivot about the pivot pin 132 as indicated by dashed arrow 1708 to raise or lower the first jaw 122 relative to the second jaw 124. Once open, the second portion 1704 of the first jaw 122 may rotate about an axis of the hinge assembly 1706 relative to the first portion 1702.

Figure 18:
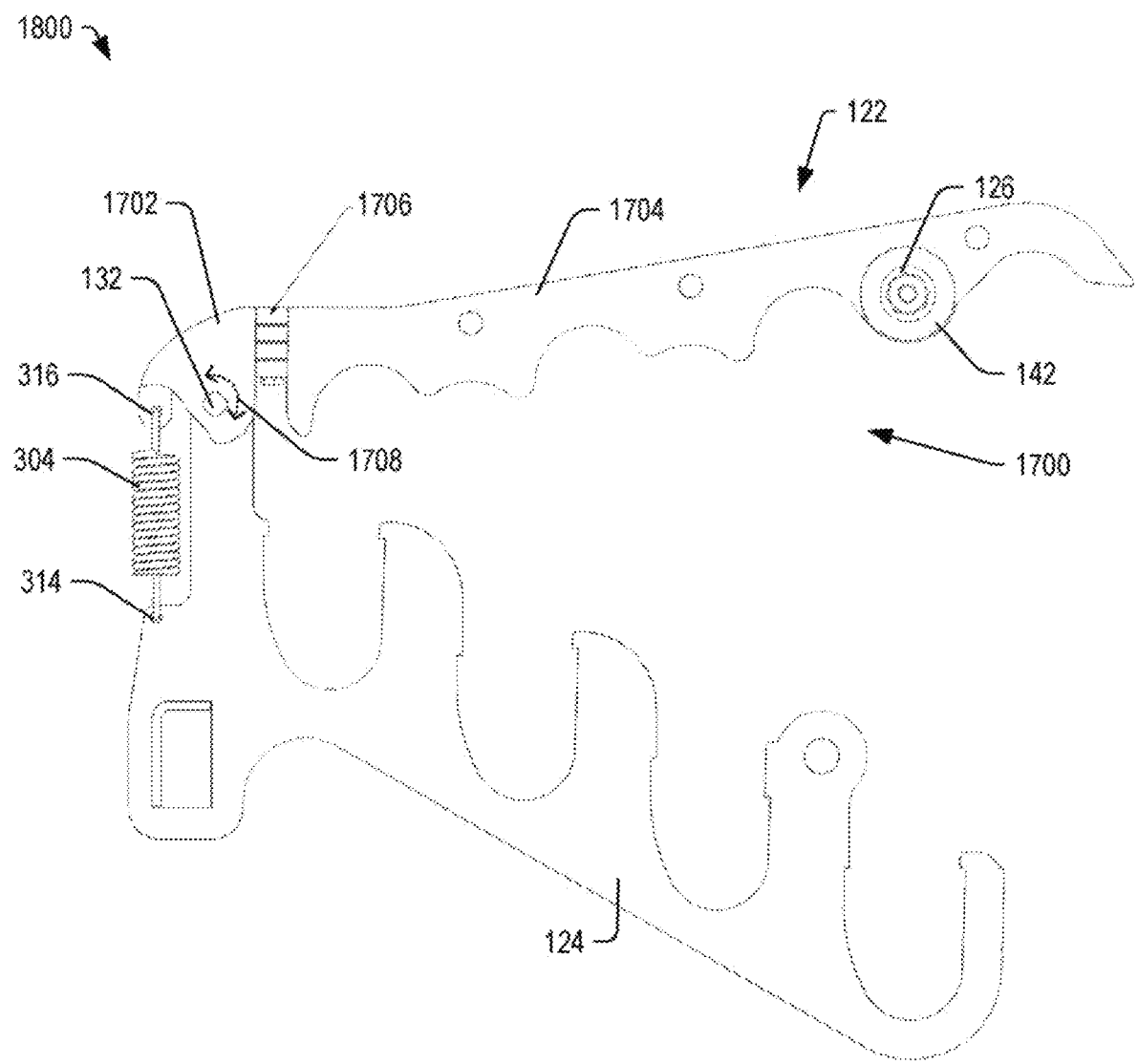
FIG. 18 depicts the muzzle holder of FIG. 17 in an open and unlocked state.

FIG. 18 depicts the lock stock 1700 of FIG. 17 in an open and unlocked state. In this example, the spring 304 may pull the first portion 1702 about the pivot pin 132, raising the hinge 1706 and the second portion 1704 to open the first jaw 122 relative to the second jaw 124.

In this example, the first jaw 122 is open relative to the second jaw 124, but the first portion 1702 and the second portion 1704 are aligned to form a substantially straight first jaw. The second portion 1704 of the first jaw 122 may be rotated about the hinge, as described below with respect to FIG. 19.

Figure 19:
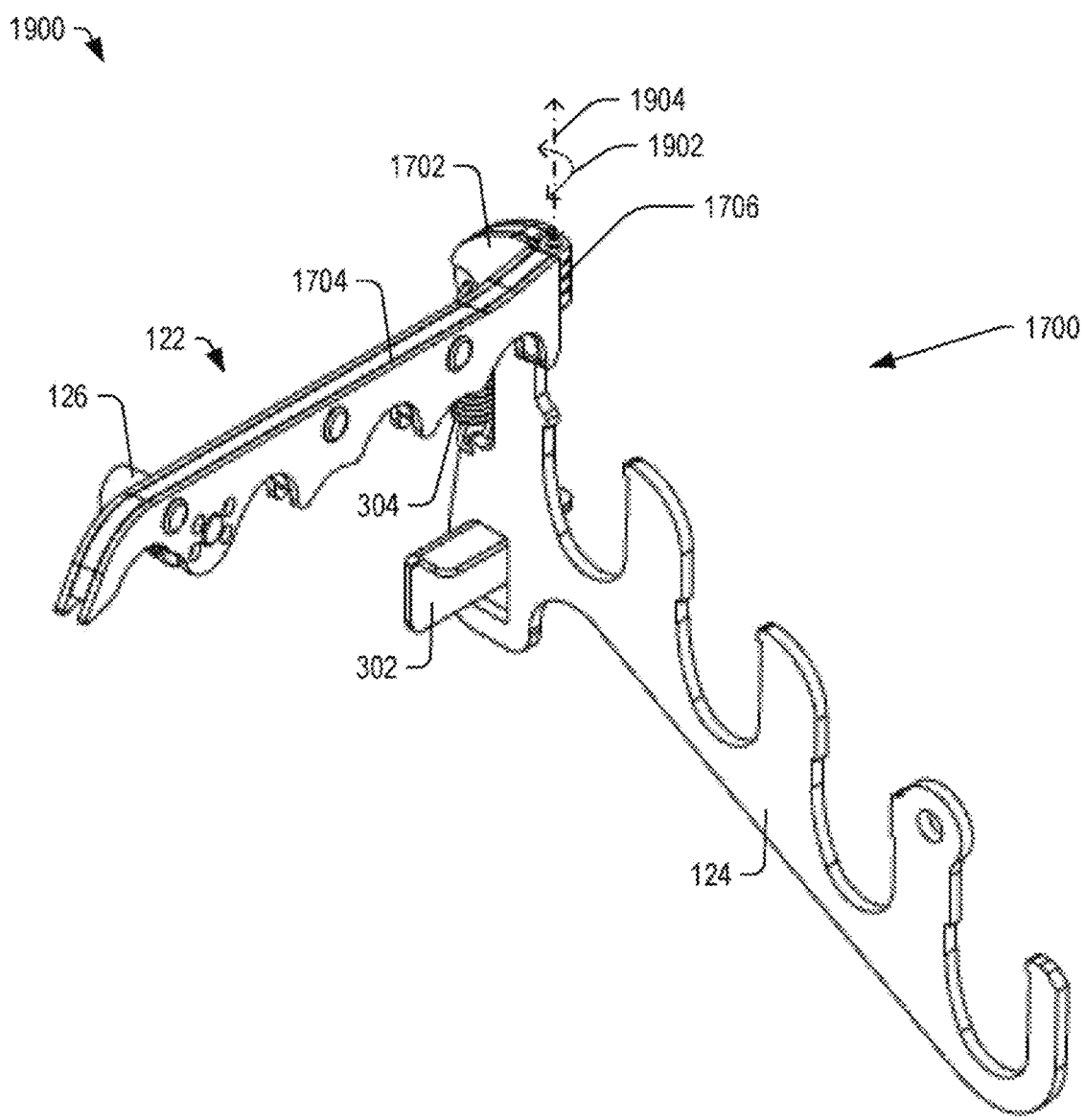
FIG. 19 depicts a left side perspective view of the muzzle holder of FIG. 17 in an open, unlocked, and hinged state.

FIG. 19 depicts a left side perspective view 1900 of the stock lock 1700 of FIG. 17 in an open, unlocked, and hinged state. In this example, the first jaw 122 is unlocked and opened relative to the second jaw 124. Further, the first portion 1702 remains aligned with the second jaw 124, but the second portion 1704 is rotated (as indicated by arrow 1902) about an axis 1904 defined by the hinge 1706 such that at least a portion of the first jaw 122 is rotated relative to the second jaw 124. Other implementations are also possible.

In this configuration, the second portion 1704 of the first jaw 122 is moved out of the way, providing access to the recesses 510 of the second jaw 124 to insert or remove the firearms 106. Other implementations are also possible.

Figure 20:
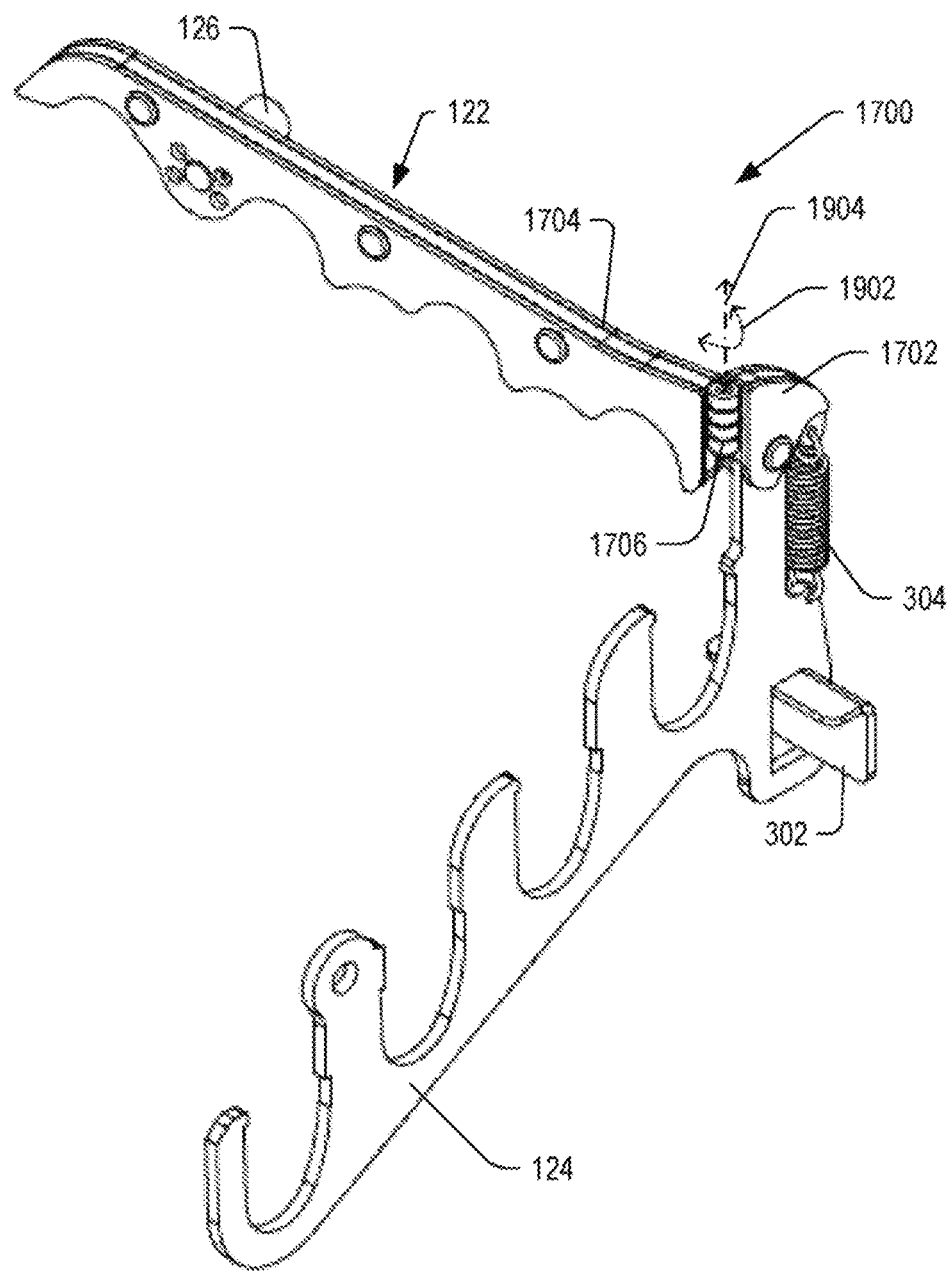
FIG. 20 depicts a right-side perspective view of the muzzle holder of FIG. 19.

FIG. 20 depicts a right-side perspective view 2000 of the stock lock 1700 of FIG. 17. It should be appreciated that the range of movement of the first jaw 122 about the pivot pin 132 may be limited by the proximity of other stock locks. Further, the range of rotation of the second portion 1704 of the first jaw 122 relative to the first portion may be limited by the back or side of the structure that supports the stock lock 1700. Other implementations are also possible.

FIGS. 21A-21D depict views of a firearm holder 120 including a reinforced lock, in accordance with certain embodiments of the present disclosure. In FIG. 21A, a top perspective view 2100 is shown in which a lock cowl 2102 may be welded to a first jaw 122 around the plunger lock 126. The lock cowl 2102 may be formed from steel or another material and may be configured to restrict direct access to the plunger lock 126 to prevent a thief from smashing or otherwise breaking the locking mechanism 142.

In some implementations, the lock cowl 2102 may have a substantially cylindrical shape. The lock cowl 2102 may include a rigid sidewall that is welded to the first jaw 122 and that defines an enclosure sized to receive the plunger lock 126. In some implementations, the lock cowl 2102 may extend around at least a portion of the plunger lock 126. The lock cowl 2102 may operate to prevent lateral access to the plunger lock 126, preventing breaking of the plunger lock 126 by a shearing force.

In the illustrated example, the first jaw 122 may be coupled to the second jaw 124 by a pivot pin 132. The upper jaw 122 may include a hinge 1706 that may allow the upper jaw 122 to swivel in one or both directions about the hinge 1706 to allow access to the recesses or slots that may hold the stock 105 of a firearm 106.

In FIG. 21B, a left side view 2120 is shown. The view 2120 depicts the first jaw 122 and the second jaw 124 in a closed state in which the first jaw 122 overlaps the second jaw 124 at each ridge or edge. The overlap removes potential pry points that might otherwise be used by a thief to break the stock lock 102.

From the side view 2120, the first mounting element 128 is shown to include engagement teeth 2122, which may engage corresponding recesses in a mounting surface such as an interior wall of a cabinet or a rear wall of a retail display shelf. The first mounting element 128 may be coupled to a member 302, which may couple the stock lock 120 and the muzzle holder 104. The muzzle holder 104 includes contact pads 306. Other implementations are also possible.

In FIG. 21C, a front view 2130 of the firearm holder 120 may include a first mounting element 128, a second mounting element 130, and a member 302 extending between the mounting elements 128 and 130. The stock lock 102 and the muzzle holder 104 are coupled to the member 302. In this implementation, the muzzle holder 104 may include contact pads 306 that may be positioned on alternate sides of the muzzle holder 104. Other implementations are also possible.

In FIG. 21D, a right side view 2140 depicts the muzzle holder 104 and the stock lock 120 including the first jaw 122 and the second jaw 124. The second mounting element 130 is also shown.

While the locking cowl 2102 is introduced with respect to the embodiments in FIGS. 21A-21D, it should be appreciated that the locking cowl 2102 may be included in the embodiments shown in any of the FIGS. 1A-20. Additionally, while the locking cowl 2102 is depicted as a cylindrical shape, it should be appreciated that the locking cowl 2102 may be implemented with other form factors. In one example, the locking cowl 2102 may be open along at least one side, such that the locking cowl 2102 partially surrounds or obscures the plunger lock 126, limiting lateral access to the plunger lock 106. Other implementations are also possible.

Figure 22A:
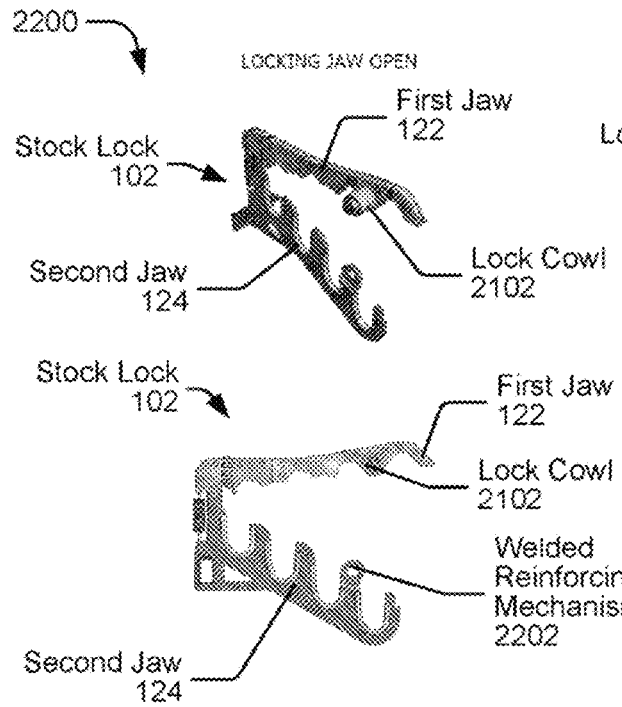
FIGS. 22A-22C depict views of the firearm holder with the reinforced lock in open and opened and hinged states, in accordance with certain embodiments of the present disclosure.
Figure 22B:
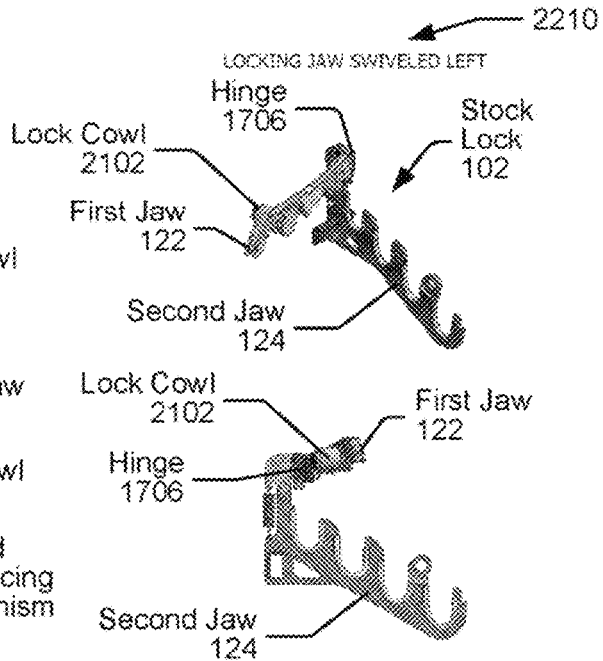
Figure 22C:
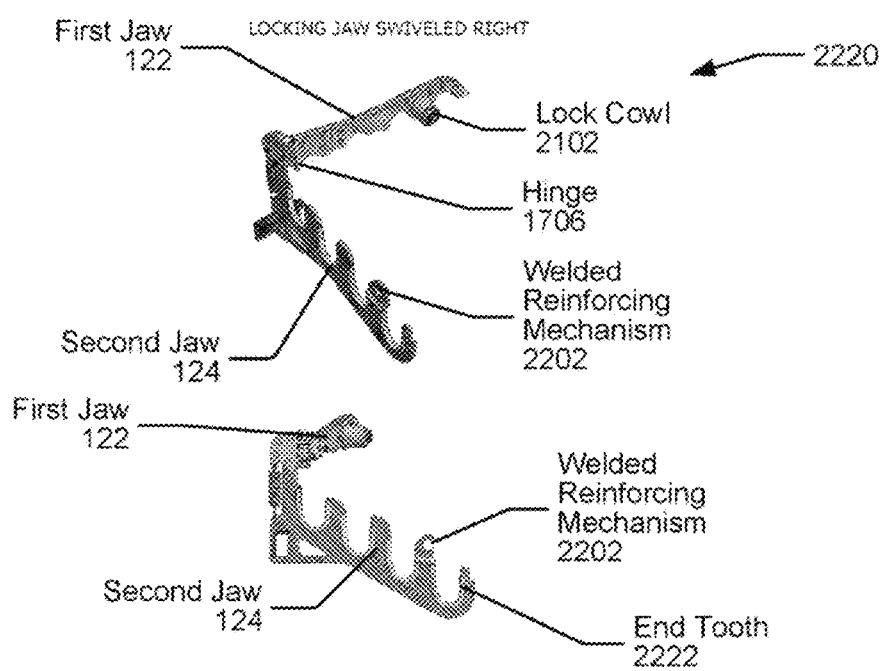

FIGS. 22A-22C depict views of the firearm holder 120 with the reinforced lock in open states, in accordance with certain embodiments of the present disclosure. In FIG. 22A, a stock lock 120 is depicted with the first jaw 122 and the second jaw 124 pivoted about a pivot pin 132 into an open state. The lock cowl 2102 may be welded to the first jaw 122 around the plunger lock 126. The second jaw 124 may include an opening with a welded reinforcement mechanism 2202, which may cooperate with the lock cowl 2102 and the plunger lock 126 to prevent unauthorized access to firearms 106 locked within the stock lock 102 when in a closed and locked state.

In FIG. 22B, the view 2210 may include the stock lock 102 that includes the hinge 1706. When the first jaw 122 is open relative to the second jaw 124, the first jaw 122 may also be swiveled left.

In FIG. 22C, the view 2220 may include the stock lock 102 that includes the hinge 1706. When the first jaw 122 is open relative to the second jaw 124, the first jaw 122 may also be swiveled right.

In the illustrated views of FIGS. 22B and 22C, the first jaw 122 may be swiveled to enlarge access to the recesses of the second jaw 124. Other implementations are also possible.

Further, in FIGS. 22A-22C, the second jaw 124 may include an end tooth 2222 that may extend into an end portion of the first jaw 122 to form an overlap. The overlap may prevent unauthorized tampering with the stock lock 102 by removing a pry point that might otherwise be used to compromise the integrity of the stock lock 102 when it is in a closed state.

In the implementations described and depicted with respect to FIGS. 1A-22C, the firearm holder 120 is depicted as holding the firearms 106 in a horizontal configuration. However, the firearm holder 120 is not limited to horizontal configurations. Another implementation including a vertical configuration is described below with respect to FIGS. 23A-24B.

Figures 23A, 23B:
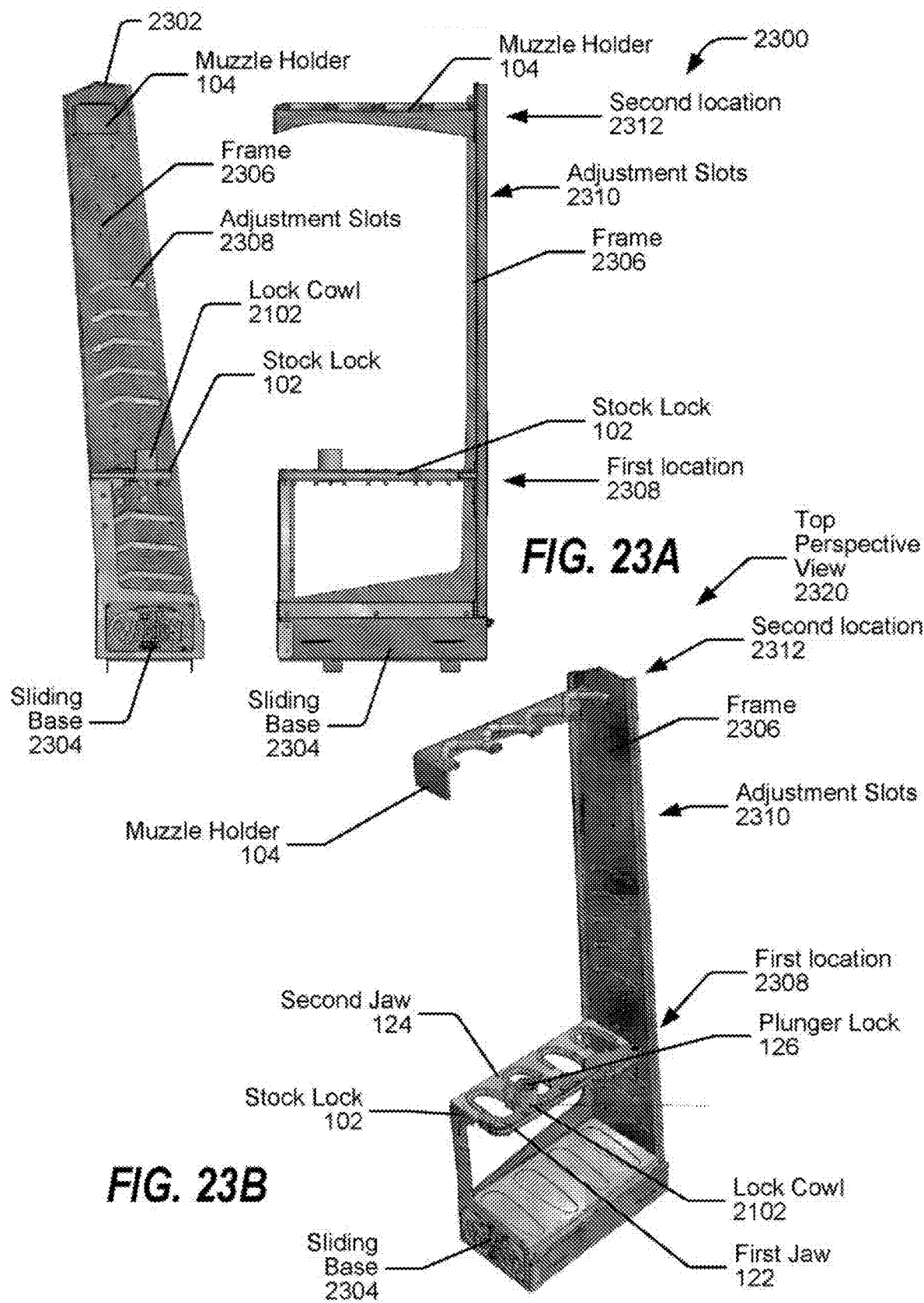
FIGS. 23A-23B depict views of the firearm holder with the reinforced lock and configured to secure firearms vertically, in accordance with certain embodiments of the present disclosure.

FIGS. 23A-23B depict views of the firearm holder with the reinforced lock and configured to secure firearms vertically, in accordance with certain embodiments of the present disclosure. In FIG. 23A, a front view and side view 2300 of a slidable firearm holder 2302 are shown. The slidable rack 2300 includes a firearm holder 2302 including a sliding base 2304 and a frame 2306 coupled to the sliding base 2304. The frame 2306 may be coupled to the stock lock 102 at a first location 2308 along the frame 2306 of the firearm holder 2302 that is above the sliding base 2304. The firearm holder 2302 further includes the muzzle holder 104 at a second location 2312. The frame 2306 may include a plurality of adjustment slots 2310, which may engage the muzzle holder 104 to enable adjustment of the spacing between the muzzle holder 104 and the stock lock 102. In some implementations, the location of the muzzle holder 104, the stock lock 102, or any combination of thereof may be adjusted using the adjustment slots 2310. The adjustment slots 2310 may include grooves, holes, or other elements to engage corresponding attachment features on the muzzle holder 104, the stock lock 102, or both. Other implementations are also possible.

In the illustrated example, the sliding base 2304 may include or be coupled to drawer slider elements that enable the sliding base 2304 to slide into and out from a cabinet or other enclosure to allow access to one or more firearms 106. The first jaw 122 and the second jaw 124 may cooperate to close over the stock 105 of the firearm 106.

In FIG. 23B, a top perspective view 2320 of the firearm holder 2302 is depicted. The muzzle holder 104 is shown including recesses to receive a muzzle or barrel of a firearm 106. The recesses may be lined or coated to prevent scratches.

The frame 2306 may include a plurality of adjustment slots 2310 to enable adjustment of the spacing between the muzzle 104 and the stock lock 102. In this example, adjustment slots 2310 may be provided along an interior surface of the frame 2306 to enable adjustment of the stock lock 102, the muzzle 104, or any combination thereof.

Figure 24A:
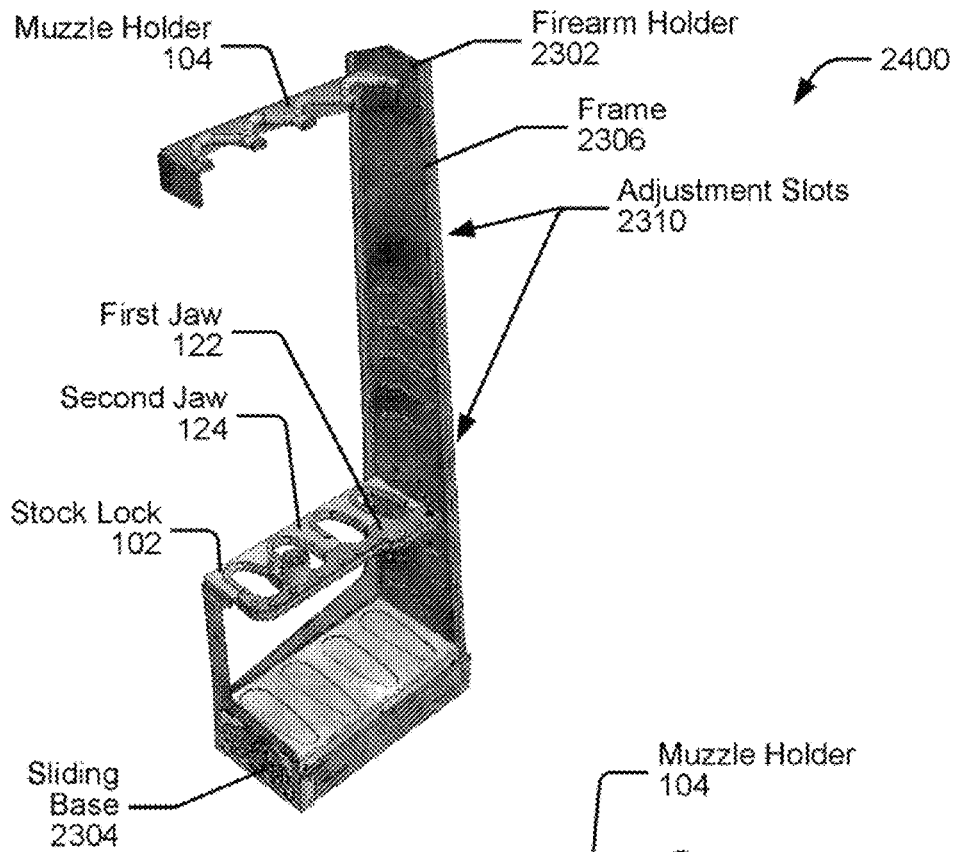
FIGS. 24A-24B depict the firearm holder configured to secure the firearms vertically and to slide into and out of an enclosure, in accordance with certain embodiments of the present disclosure.
Figure 24B:
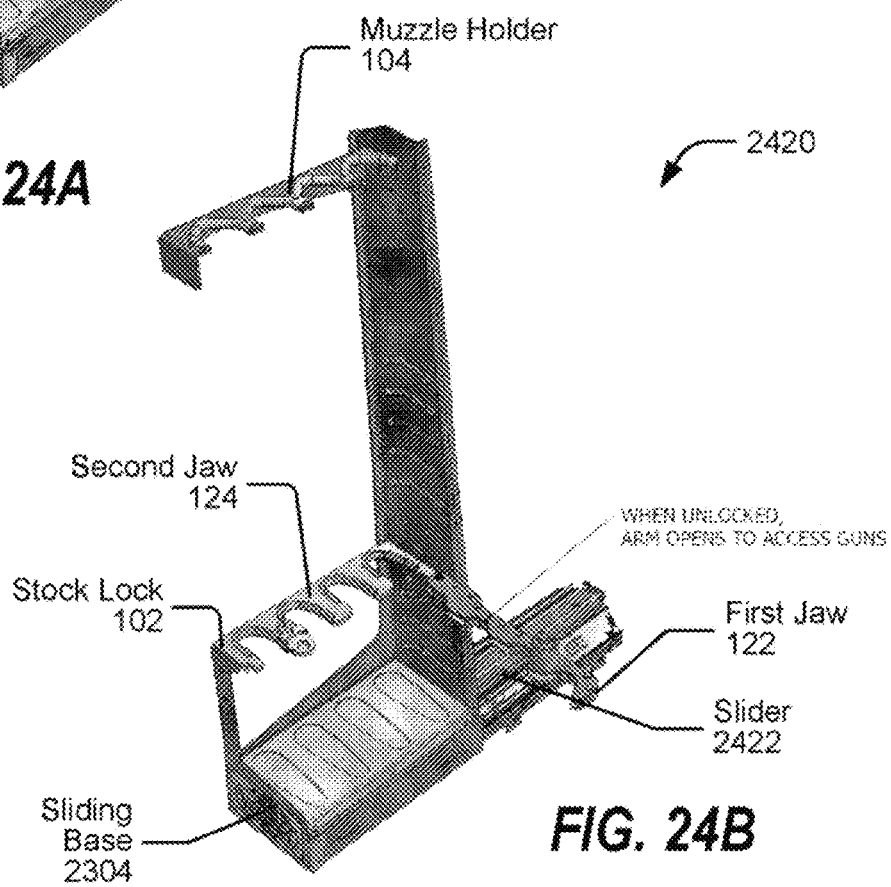

FIGS. 24A-24B depict the firearm holder configured to secure the firearms vertically and to slide into and out of an enclosure, in accordance with certain embodiments of the present disclosure. In FIG. 24A, a top perspective view 2400 of a firearm holder 2302 is shown with the sliding base 2304 in a retracted state. The stock lock 102 includes the first jaw 122 and the second jaw 124 in a closed state.

In FIG. 24B, a top perspective view 2400 of the firearm holder 2302 is shown with the sliding base 2340 in an extended state. The firearm holder 2302 includes a sliding base 2304 coupled to a slider 2422. The slider 2422 may include one or more drawer slide mechanisms configured to engage corresponding mechanisms beneath the sliding base 2304, which cooperate to enable the firearm holder 2302 to slide into and out of a cabinet on the slider 2422. Other implementations are also possible.

In conjunction with the devices and structures recited herein with respect to FIGS. 1A-24B, a firearm holder may include a stock lock and a muzzle holder coupled to a member or to a frame. The stock lock may include a second jaw and a first jaw coupled by a pivot pin forming a hinge on a first end. The first jaw may be opened or closed relative to the second jaw about the pivot pin. One of the first jaw or the second jaw may include a locking mechanism on an end opposite to the pivot pin, and the locking mechanism may releasably couple the first jaw to the second jaw in a closed state. The second jaw may include a plurality of recesses and the first jaw may include a corresponding plurality of recesses, which recesses may cooperate to secure a neck portions of a muzzles of firearms when the first jaw is closed over the second jaw and to release the firearm when the first jaw is opened relative to the second jaw. In some embodiments, the muzzle holder may include a cover material (such as rubber or fabric) configured to support the muzzle of a firearm without scratching the muzzle. Other implementations are also possible.

In some implementations, the stock lock may include a cowl, shroud, or other lock-protection mechanism configured to restrict lateral access to the plunger lock to prevent a thief from shearing or otherwise breaking the plunger lock. Additionally, the first jaw and the second jaw may be configured to overlap between the firearms 106 and at the ends of the first jaw and the second jaw to prevent the stock lock from being pried open. Other implementations are also possible.

In some embodiments, the stock lock may include a swivel assembly including a swivel plate coupled to the second jaw and a swivel housing defining a pocket or enclosure sized to receive the swivel plate and to secure the swivel plate within the enclosure. The swivel housing may further include an opening configured to couple the swivel assembly to the first jaw via the pivot pin. The swivel assembly may enable the first jaw to rotate or turn relative to the second jaw, and the first jaw may open and close by pivoting about the pivot pin to move the first jaw relative to the second jaw. The first jaw may then rotate about an axis defined by the swivel assembly to move (rotate, pivot, or swivel) the first jaw out of alignment with the second jaw. Other implementations are also possible.

In another embodiment, the stock lock may include a second jaw coupled to a first portion of a first jaw by a pivot pin. The first jaw may include the first portion and a second portion coupled to the first portion by a hinge. The first jaw may be configured to pivot about the pivot pin to open the first jaw relative to the second jaw. The second portion of the first jaw may be configured to rotate about an axis defined by the hinge and relative to the second jaw to expand the opening to allow for enhanced access to the firearms 106. Other embodiments are also possible.

Although the present invention has been described with reference to preferred embodiments, workers skilled in the art will recognize that changes may be made in form and detail without departing from the scope of the invention.

What is claimed is:

1. A device configured to hold a plurality of firearms, the device comprising:
   a stock holder comprising:
      a first jaw comprising first and second ridges, wherein a first recess is formed between the first and second ridges;
      a second jaw comprising third and fourth ridges, wherein a second recess is formed between the third and fourth ridges; and
      a first pivot located at a distal end of the first jaw and at a distal end of the second jaw, the first pivot providing for opening and closing of the first jaw relative to the second jaw;
      wherein in a closed configuration of the device, a proximal end of the first jaw is connected to a proximal end of the second jaw, and the first recess and second recess cooperate to form an enclosure configured to surround a portion of a stock of one of the plurality of firearms; and
      wherein the first jaw comprises inner and outer plates that overlap inner and outer sides of the third and fourth ridges in the closed configuration.

2. The device of claim 1, wherein the first pivot has a horizontal rotation axis, and the proximal end of the first jaw moves vertically with respect to the proximal end of the second jaw.

3. The device of claim 1, wherein the first pivot has a vertical rotation axis, and the proximal end of the first jaw moves horizontally with respect to the proximal end of the second jaw.

4. The device of claim 1, wherein the first pivot has a rotation axis that is tilted at an angle such that the rotation axis is neither vertical nor horizontal.

5. The device of claim 1 comprising:
   an opening in the second jaw; and
   a lock coupled to the first jaw and configured to selectively engage the opening in the second jaw to secure the first jaw to the second jaw in the closed configuration.

6. The device of claim 5 comprising a cowl that extends around at least a portion of the lock.

7. The device of claim 1 comprising a spring configured to bias the proximal end of the first jaw away from the proximal end of the second jaw about the first pivot.

8. The device of claim 1 comprising a horizontal rail to which the stock holder is attached, wherein the horizontal rail is configured for attachment to a vertical surface.

9. The device of claim 8 comprising a muzzle holder configured for mounting on the horizontal rail at a variable distance from the stock holder.

10. The device of claim 1, wherein the stock holder comprises a second pivot located at the distal end of the first jaw, the second pivot having a second rotational axis that is oriented at an angle with respect to a first rotational axis of the first pivot.

11. The device of claim 1, wherein the stock holder comprises a second pivot located at the distal end of the second jaw, the second pivot having a second rotational axis that is oriented at an angle with respect to a first rotational axis of the first pivot.

12. The device of claim 1 comprising a vertical frame to which the stock holder is attached.

13. The device of claim 12 comprising a muzzle holder configured for mounting on the vertical frame at a variable distance from the stock holder.

14. The device of claim 12 comprising a sliding base attached to the vertical frame, the sliding base positioned below the stock holder.

* * * * *